US012688586B2

(12) United States Patent (10) Patent No.: US 12,688,586 B2
Fujii (45) Date of Patent: Jul. 21, 2026

(54) IMAGE PROCESSING DEVICE, IMAGE PROCESSING METHOD, AND PROGRAM

(71) Applicant: SONY GROUP CORPORATION, Tokyo (JP)

(72) Inventor: Hiroyoshi Fujii, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 848 days.

(21) Appl. No.: 17/916,425

(22) PCT Filed: May 7, 2021

(86) PCT No.: PCT/JP2021/017541
§ 371 (c)(1),
(2) Date: Sep. 30, 2022

(87) PCT Pub. No.: WO2021/230158
PCT Pub. Date: Nov. 18, 2021

(65) Prior Publication Data
US 2023/0154011 A1 May 18, 2023

(30) Foreign Application Priority Data

May 15, 2020 (JP) ................................. 2020-086129

(51) Int. Cl.
*G06T 7/20* (2017.01)
*G06T 5/50* (2006.01)
(Continued)

(52) U.S. Cl.
CPC .................. *G06T 7/20* (2013.01); *G06T 5/50* (2013.01); *G06V 30/22* (2022.01); *H04N 23/69* (2023.01);
(Continued)

(58) Field of Classification Search
CPC ... G06T 7/20; G06T 5/50; G06T 2207/20221; G06V 30/22; G06V 2201/07; H04N 23/69; H04N 23/695; H04N 23/60
See application file for complete search history.

(56) References Cited

U.S. PATENT DOCUMENTS

2002/0008692 A1 1/2002 Omura

FOREIGN PATENT DOCUMENTS

CN      104794107 A    7/2015
CN      107909022 A    4/2018
(Continued)

OTHER PUBLICATIONS

Seiji Okuni et al., "Video Scene Segmentation Using the State Recognition of Blackboard for Blended Learning", 2007 International Conference on Convergence Information Technology 2017 (Year: 2017).*

(Continued)

*Primary Examiner* — Mekonen T Bekele
(74) *Attorney, Agent, or Firm* — Paratus Law Group, PLLC

(57) ABSTRACT

An image processing device according to the present disclosure includes: a movement detection unit that detects movement of a movable writing medium based on moving image data obtained by imaging the writing medium and a writer writing on the writing medium; and a writing portion detection unit that detects a writing portion on the writing medium, wherein the writing portion detection unit executes processing corresponding to the movement of the writing medium in a case where the movement of the writing medium is detected.

18 Claims, 14 Drawing Sheets

(51) Int. Cl.
  *G06V 30/22* (2022.01)
  *H04N 23/69* (2023.01)
  *H04N 23/695* (2023.01)

(52) U.S. Cl.
  CPC . *H04N 23/695* (2023.01); *G06T 2207/20221* (2013.01); *G06V 2201/07* (2022.01)

(56) References Cited

FOREIGN PATENT DOCUMENTS

| | | | |
|---|---|---|---|
| CN | 111008969 | A | 4/2020 |
| JP | H04-065964 | A | 3/1992 |
| JP | 2016-110509 | A | 6/2016 |
| JP | 6399135 | B1 | 10/2018 |
| JP | 2018-170645 | A | 11/2018 |
| KR | 20130040671 | A | 4/2013 |
| WO | WO 2018/163977 | A1 | 9/2018 |

OTHER PUBLICATIONS

Chung-Wei Liang et al., "Moving Object Classification Using a Combination of Static Appearance Features and Spatial and Temporal Entropy Values of Optical Flows", vol. 16, No. 6, Dec. 2015, IEEE (Year: 2015).*
Seiji Okuni et al ., "Video Scene Segmentation Using the State Recognition of Blackboard for Blended Learning", 2007 International Conference on Convergence Information Technology, pub. 2007, (Year: 2007).*
Nishigori et al., An Automatic Camera Control System for Distance Lecture with Blackboard, Technical Report of IEICE, Mar. 8, 2001, pp. 79-86, vol. 100, No. 701.

* cited by examiner (a)                                          (b)

MOVING IMAGE DATA        DETECTION RESULT OF WRITING PORTION

MOVING IMAGE DATA

GENERATION RESULT OF
WRITING LOG

IMAGE PROCESSING DEVICE, IMAGE PROCESSING METHOD, AND PROGRAM

CROSS REFERENCE TO PRIOR APPLICATION

This application is a National Stage Patent Application of PCT International Patent Application No. PCT/JP2021/017541 (filed on May 7, 2021) under 35 U.S.C. § 371, which claims priority to Japanese Patent Application No. 2020-086129 (filed on May 15, 2020), which are all hereby incorporated by reference in their entirety.

FIELD

The present disclosure relates to an image processing device, an image processing method, and a program.

BACKGROUND

A technique for extracting a writing portion on a writing medium from moving image data obtained by imaging a state where a writer is writing on the writing medium has been proposed (for example, see Patent Literature 1). Such image processing requires further accuracy.

CITATION LIST

Patent Literature

Patent Literature 1: WO 2018/163977 A

SUMMARY

Technical Problem

The present disclosure provides an image processing device, an image processing method, and a program capable of performing image processing with high accuracy even in a case where writing is performed on a movable writing medium.

Solution to Problem

An image processing device according to the present disclosure includes: a movement detection unit that detects movement of a movable writing medium based on moving image data obtained by imaging the writing medium and a writer writing on the writing medium; and a writing portion detection unit that detects a writing portion on the writing medium, wherein the writing portion detection unit executes processing corresponding to the movement of the writing medium in a case where the movement of the writing medium is detected.

Advantageous Effects of Invention

According to the image processing device, the image processing method, and the program according to the present disclosure, image processing can be performed with high accuracy even in the case where writing is performed on the movable writing medium.

DESCRIPTION OF EMBODIMENTS

Figure 1:
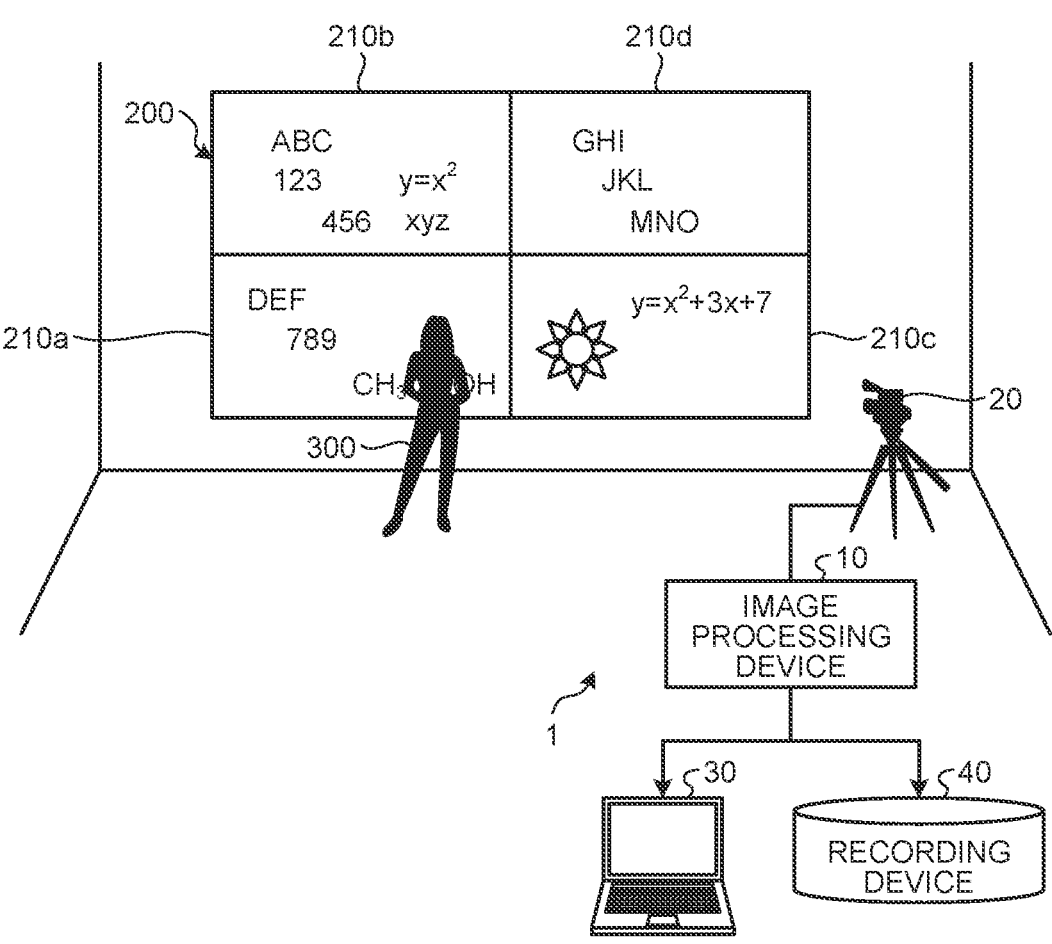
FIG. 1 is a diagram illustrating an example of a configuration of an image processing system according to a first embodiment of the present disclosure.

Hereinafter, embodiments of the present disclosure will be described in detail with reference to the drawings. Note that, in the following embodiments, the same parts are denoted by the same reference numerals so that redundant description can be omitted.

First Embodiment

A first embodiment will be described with reference to the drawings.
(Example of Configuration of Information Processing System)

FIG. 1 is a diagram illustrating an example of a configuration of an image processing system 1 according to the first embodiment of the present disclosure. As illustrated in FIG. 1, the image processing system 1 of the first embodiment includes an image processing device 10, an imaging device 20, an input/output device 30, and a recording device 40.

The imaging device 20 is a video camera or the like that records a lecture, training, a seminar, a conference, or the like in which a writing medium such as a blackboard, a whiteboard, or an electronic blackboard is used. In the example of FIG. 1, the imaging device 20 images a state in which a writer 300 is giving an explanation while writing on a whiteboard 200.

Here, the writer 300 is a lecturer, a teacher, a presenter, or the like who gives a lecture, training, a seminar, a conference, or the like.

The whiteboard 200 as a writing medium group includes a plurality of board surfaces 210a, 210b, 210c, and 210d as writing media. In addition, the whiteboard 200 itself is fixed to, for example, a wall surface of a building or the like, but is configured as a slidable whiteboard in which vertically arranged board surfaces, that is, a board surface 210a and a board surface 210b, or a board surface 210c and a board surface 210d, are replaceable with each other due to raising and lowering. The writer 300 can write or erase the written content on the individual board surfaces 210a to 210d while raising or lowering the board surfaces 210a and 210b or the board surfaces 210c and 210d vertically arranged.

However, the whiteboard 200 may be of a type in which horizontally arranged board surfaces, that is, the board surface 210a and the board surface 210c, or the board surface 210b and the board surface 210d, are replaced with each other due to lateral sliding. In addition, the number of board surfaces 210a to 210d that move at one time may be one, or three or more.

The board surfaces 210a to 210d may have black, green, or other colors in addition to white. Characters, graphs, figures, or the like may be written on the board surfaces 210a to 210d. The writing color may also be any color as long as it can be identified on the board surfaces 210a to 210d, and a plurality of colors may be used.

Hereinafter, when no distinction is made between the individual board surfaces 210a, 210b, 210c, and 210d, they may be simply referred to as a board surface 210.

The imaging device 20 is set at a position and an angle of view at which the writer 300 and the whiteboard 200 can be simultaneously imaged. The imaging device 20 generates moving image data obtained by imaging the writer 300 and the whiteboard 200, and outputs the generated moving image data to the image processing device 10.

The image processing device 10 performs processing of extracting a writing portion from the moving image data generated by the imaging device 20. At this time, the image processing device 10 performs processing according to raising and lowering movement of the board surface 210.

The input/output device 30 is configured such that a user can input an instruction or the like to the image processing device 10. Further, the input/output device 30 acquires an extraction result of the writing portion from the image processing device 10 and presents the extraction result to the user or the like, for example.

The recording device 40 records the moving image data processed by the image processing device 10, the extraction result of the writing portion, and the like.
(Configuration Example of Image Processing Device)

Figure 2:
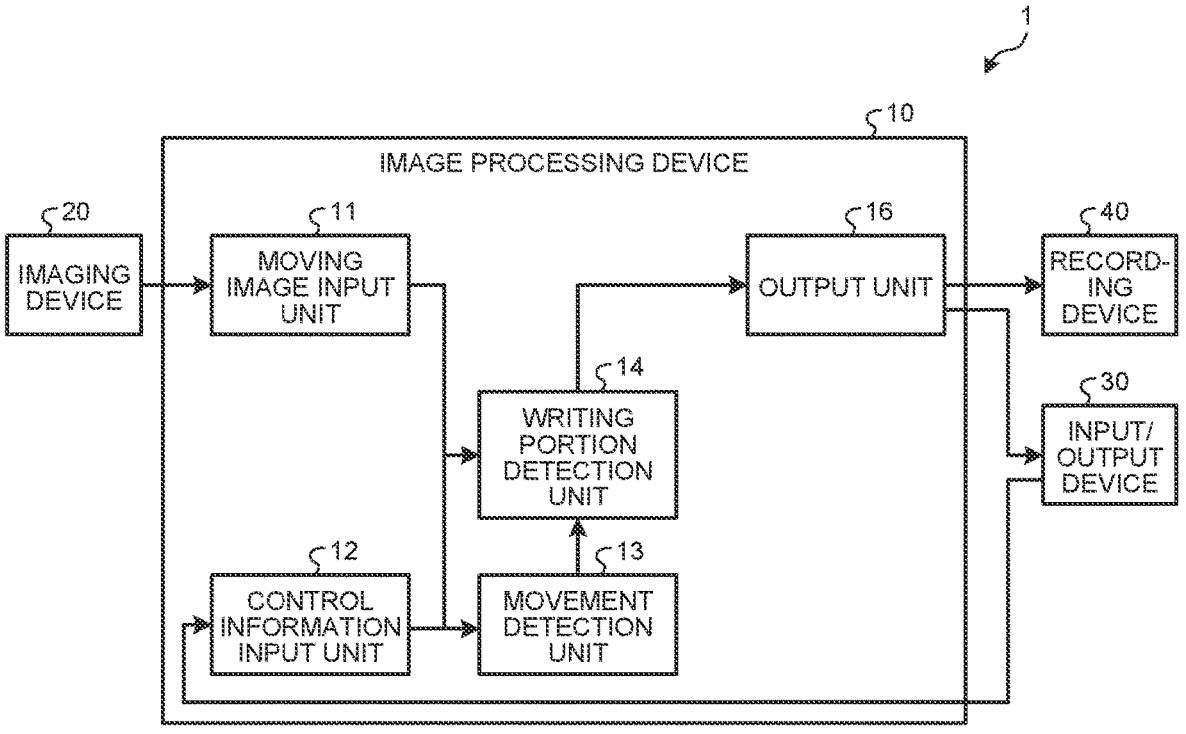
FIG. 2 is a block diagram illustrating an example of a functional configuration of an image processing device according to the first embodiment of the present disclosure.

FIG. 2 is a block diagram illustrating an example of a functional configuration of the image processing device 10 according to the first embodiment of the present disclosure.

As illustrated in FIG. 2, the image processing device 10 is connected to one or more imaging devices 20, input/output devices 30, and recording devices 40. The image processing device 10 may be connected directly to the imaging device 20, the input/output device 30, and the recording device 40, or may be connected via a network.

The image processing device 10 receives the moving image data output from one or more imaging devices 20, and executes movement detection of individual board surfaces 210a to 210d of the whiteboard 200 and other processing.

In order to realize such a function, the image processing device 10 includes, for example, a moving image input unit 11, a control information input unit 12, a movement detection unit 13, a writing portion detection unit 14, and an output unit 16 as a functional configuration.

The moving image input unit 11 receives at least one piece of moving image data output from one or more imaging devices 20 as a video signal, and passes the video signal to the movement detection unit 13 and the writing portion detection unit 14.

The control information input unit 12 receives control information, which is an instruction or the like from the user input to the input/output device 30, as a rule signal, and passes the control information to the movement detection unit 13 and the writing portion detection unit 14.

The movement detection unit 13 receives the moving image data from the moving image input unit 11, detects a straight line portion from a frame of the individual board surfaces 210a to 210d, and detects the presence or absence of movement, the direction and speed of movement, and the like of the individual board surfaces 210a to 210d from the motion of the straight line portion. At this time, the movement detection unit 13 refers to the control information received from the control information input unit 12. The movement detection unit 13 passes a movement detection result of the individual board surfaces 210a to 210d to the writing portion detection unit 14.

The writing portion detection unit 14 detects the writing portion written on the board surfaces 210a to 210d by the writer 300 from the moving image data received from the moving image input unit 11. At this time, the writing portion detection unit 14 executes processing according to the movement detection result for each of the board surfaces 210a to 210d based on the movement detection result of the individual board surfaces 210a to 210d received from the movement detection unit 13. At this time, the writing portion detection unit 14 refers to the control information received from the control information input unit 12. The writing portion detection unit 14 passes a detection result of the writing portion on the board surfaces 210a to 210d to the output unit 16.

The output unit 16 outputs the detection result of the writing portion by the writing portion detection unit 14 to one or more input/output devices 30 and one or more recording devices 40 connected to the image processing device 10. The output unit 16 may directly output the moving image data imaged by the imaging device 20 to the recording device 40.

The user can check the detection result of the writing portion output from the image processing device 10 with the input/output device 30. The user may be able to view the moving image data with the input/output device 30. Further, the user can input the control information from the input/output device 30. However, the input/output device 30 may not be an independent device, and the image processing device 10 may have the function of the input/output device 30.

The control information that can be input by the user includes, for example, information used for movement determination of the board surfaces 210*a* to 210*d*, the content of processing and control based on a movement determination result, the content of processing on the moving image data, supplementary information used for movement detection of the board surfaces 210*a* to 210*d*, and the like.

The information used for the movement determination of the board surfaces 210*a* to 210*d* includes, for example, information on a straight line portion to be detected from the frame of the board surfaces 210*a* to 210*d*. The content of processing and control based on the movement determination result includes making the content of processing and control different between the board surface 210 whose movement has been detected and the board surface 210 whose movement has not been detected.

The supplementary information used for movement detection of the board surfaces 210*a* to 210*d* includes, for example, the movement direction of the individual board surfaces 210*a* to 210*d*, and the number, configuration, arrangement, color, and the like of the board surfaces 210*a* to 210*d*.

The storage device 40 records the detection result of the writing portion acquired from the image processing device 10. However, the storage device 40 may not be an independent device, and the image processing device 10 may have the function of the storage device 40.

Figure 3:
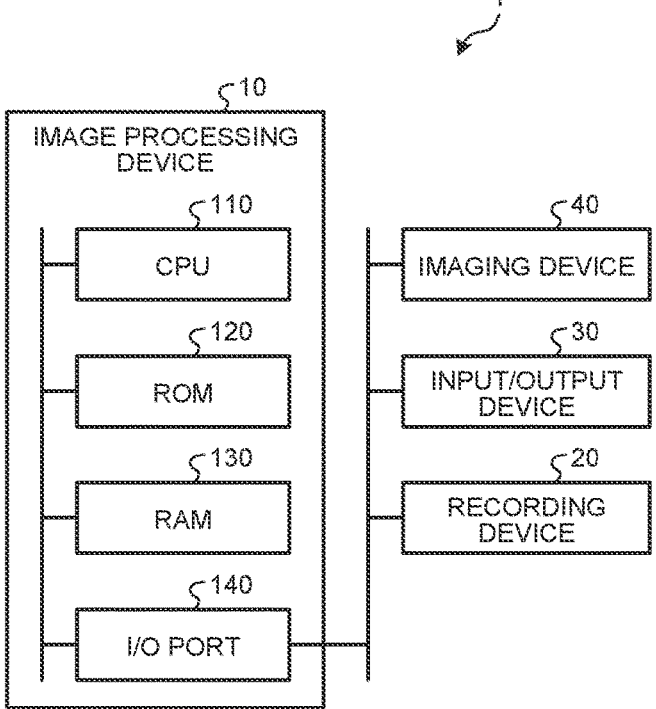
FIG. 3 is a block diagram illustrating an example of a hardware configuration of the image processing device according to the first embodiment of the present disclosure.

FIG. 3 is a block diagram illustrating an example of a hardware configuration of the image processing device 10 according to the first embodiment of the present disclosure.

As illustrated in FIG. 3, the image processing device 10 is configured as a computer that includes, for example, a central processing unit (CPU) 110, a read only memory (ROM) 120, a random access memory (RAM) 130, and an in/out (I/O) port 140 as the hardware configuration.

The CPU 110 reads, for example, a program related to image processing stored in the ROM 120, deploys the program on the RAM 130, and operates according to the program. As a result, the CPU 110 can realize various functions as the image processing device 10.

The I/O port 140 is connected to the imaging device 20, the input/output device 30, and the recording device 40, which are external devices of the image processing device 10, and transmits and receives various data and information such as the moving image data, the detection result of the writing portion, and the control information to and from these external devices.

(Example of Movement Detection Operation of Board Surface)

Next, movement detection operation of the board surfaces 210*a* to 210*d* by the image processing device 10 of the first embodiment will be described with reference to FIG. 4.

Figure 4:
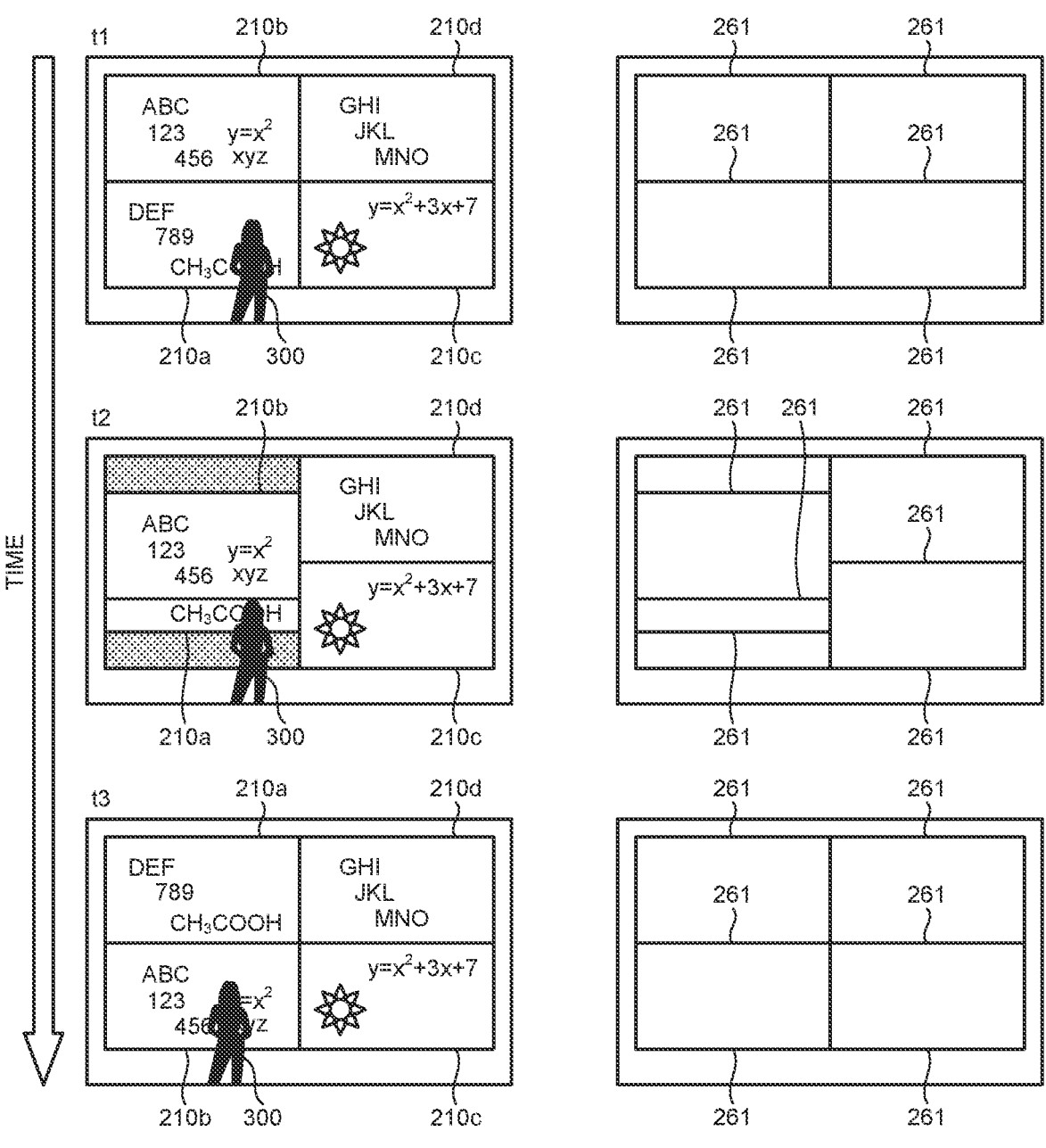
FIG. 4 is a diagram illustrating a movement detection result of a board surface by the image processing device according to the first embodiment of the present disclosure, together with moving image data.

FIG. 4 is a diagram illustrating the movement detection result of the board surfaces 210*a* to 210*d* by the image processing device 10 according to the first embodiment of the present disclosure, together with the moving image data. FIG. 4 illustrates a frame of moving image data at each of times t1, t2, and t3, and a detection result of the board surfaces 210*a* to 210*d* in the frame. Here, one frame refers to one shot of a still image constituting the moving image data.

At time t1 in FIG. 4, the movement detection unit 13 of the image processing device 10 detects the board surfaces 210*a* to 210*d* by detecting the straight line portion 261 of the frame of the individual board surfaces 210*a* to 210*d*.

The straight line portion 261 of the frame of the board surfaces 210*a* to 210*d* can be detected, for example, by performing edge extraction based on a difference in luminance value in the moving image data, binarization of the moving image data, or the like, and performing Hough conversion or the like on the obtained data.

However, in addition to the frame of the board surfaces 210*a* to 210*d*, for example, straight lines and the like included in the writing portion on the board surfaces 210*a* to 210*d* can also be detected as the straight line portion. By referring to the control information from the input/output device 30, the movement detection unit 13 can determine whether or not the detected straight line portion is the frame of the board surfaces 210*a* to 210*d* based on the length of the straight line portion 261 of the frame of the individual board surfaces 210*a* to 210*d*, the position where the straight line portion 261 of the frame of the individual board surfaces 210*a* to 210*d* is detected, and the like.

For example, in a case where the detected straight line portion is a straight line of the writing portion, it can be determined that the detected straight portion is not the straight line portion 261 of the frame of the board surfaces 210*a* to 210*d*, for example, because the detected straight line portion is shorter than the frame of the board surfaces 210*a* to 210*d* or is detected inside the position of the frame of the board surfaces 210*a* to 210*d*.

Then, when the straight line portion 261 of the individual board surfaces 210*a* to 210*d* is detected, the movement detection unit 13 starts tracking the detected straight line portion 261 of the board surfaces 210*a* to 210*d* from this point on.

At time t2 in FIG. 4, the board surfaces 210*a* and 210*b* arranged vertically are being raised and lowered by the writer 300 or the like. The movement detection unit 13 tracks the straight line portion 261, for example, by taking a difference from the detection result of the straight line portion 261 in the previous frame. The movement detection unit 13 detects that the straight line portion 261 is moving based on the fact that a difference has arisen in the detection result of the straight line portion 261 in the current frame from that in the previous frame, and detects that the movement has ended.

At time t3 in FIG. 4, raising and lowering of the board surfaces 210*a* and 210*b* ends, and the positions of the board surfaces 210*a* and 210*b* are replaced with each other, with the board surface 210*a* arranged above and the board surface 210*b* arranged below. The movement detection unit 13 is continuously tracking the straight line portion 261 of the individual board surfaces 210*a* to 210*d*.

(Example of Detection Operation of Writing Portion)

Figure 5:
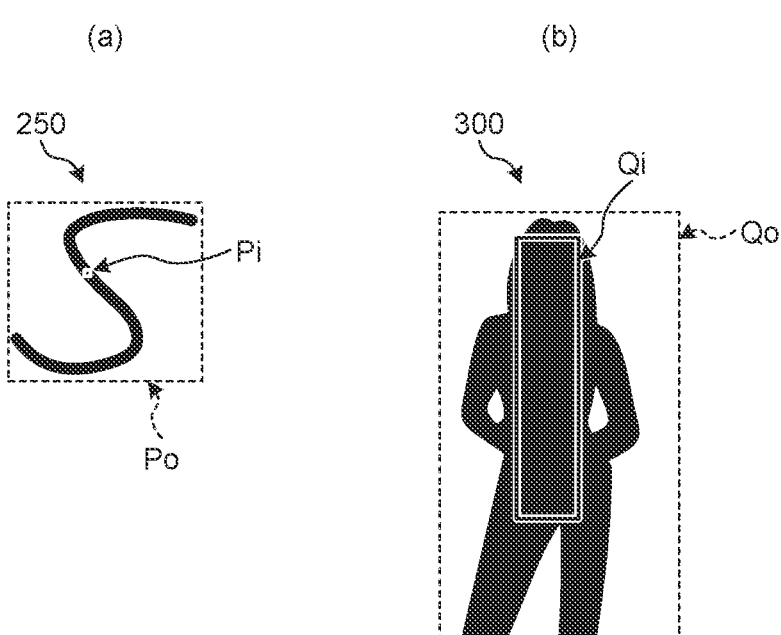
FIG. 5 is a diagram explaining a method of distinguishing between a writing portion and a non-writing portion by the image processing device according to the first embodiment of the present disclosure.

Next, detection operation of the writing portion on the board surface 210 by the image processing device 10 of the first embodiment will be described with reference to FIGS. 5 and 6. FIG. 5 is a diagram explaining a method of distinguishing between the writing portion and a non-writing portion by the image processing device 10 according to the first embodiment of the present disclosure.

As illustrated in FIG. 5(*a*), a writing portion 250 written on the board surface 210 is recorded in the moving image data. As illustrated in FIG. 5(*b*), for example, the writer 300 or the like standing in front of the board surface 210 is also recorded in the moving image data such that the writer 300 or the like overlaps the board surface 210. The writing portion detection unit 14 of the image processing device 10 distinguishes the writing portion 250 from the writer 300 or the like who appears on the board surface 210 in this manner, and detects the writing portion 250.

In performing the detection operation of the writing portion 250, the writing portion detection unit 14 refers to the movement detection result of the board surfaces 210a to 210d detected by the movement detection unit 13, and makes the detection operation of the writing portion 250 different between each of the board surfaces 210a to 210d according to the movement detection result.

In a case where the movement detection unit 13 has not detected the movement of a predetermined board surface 210 subject to the detection operation of the writing portion 250, the writing portion detection unit 14 attempts to detect the writing portion 250 on the board surface 210.

The detection operation of the writing portion 250 by the writing portion detection unit 14 is executed using a reference frame, for example. The reference frame is updated at each predetermined operation by the writing portion detection unit 14, and is a frame serving as a reference of a subsequent operation. For example, the initial reference frame may be a frame that captures the board surfaces 210a to 210d before writing is started and before they are replaced with each other due to raising and lowering movement.

The writing portion detection unit 14 takes a difference in each pixel between the current frame and the reference frame, extracts a pixel having a large difference, that is, a pixel having a great change from the state in the reference frame, and detects a set portion in which such pixels continuously exist.

Such a set portion can include, for example, the writing portion 250 added by the writer 300, the writer 300 performing some action in front of the board surface 210, and the like. In order to distinguish between them, the writing portion detection unit 14 performs shape evaluation, extraction time evaluation, and stationary time evaluation described below.

First, the writing portion detection unit 14 sets, for each detected individual set portion, an outer quadrilateral, which is the smallest quadrilateral including the entire set portion, and an inner quadrilateral, which is the largest quadrilateral that fits into the set portion. In addition, the writing portion detection unit 14 calculates an evaluation value α of shape from the size of the inner quadrilateral with respect to the set outer quadrilateral. The evaluation value α of shape is set such that the smaller the size of the inner quadrilateral is with respect to the outer quadrilateral, the higher the value is.

As illustrated in FIG. 5(a), in a case where the set portion detected by the writing portion detection unit 14 is the writing portion 250, since the writing portion 250 is mainly composed of a combination of line segments, the inner quadrilateral Pi is relatively smaller than the outer quadrilateral Po. Therefore, the evaluation value α of the shape is high.

As illustrated in FIG. 5(b), in a case where the set portion detected by the writing portion detection unit 14 is the writer 300, since the writer 300 is composed of portions having a collective volume such as a head and torso, the inner quadrilateral Qi is relatively larger than the outer quadrilateral Qo. Therefore, the evaluation value α of the shape is low.

Next, the writing portion detection unit 14 checks, for each detected set portion, the time during which a change has continued to occur in pixels included in the set portion. That is, the writing portion detection unit 14 calculates a difference between the current frame or the plurality of frames before the current frame and the reference frame for at least some or all of the pixels included in the set portion.

In addition, the writing portion detection unit 14 accumulates frames having a large difference from the reference frame, and sets the number of consecutive frames among the accumulated frames as the evaluation value β of extraction time, which is the time during which a change has been continuously extracted in the pixels included in the set portion. That is, the evaluation value β of extraction time is higher as the number of consecutive frames is larger and the extraction time of the change is longer.

In a case where the set portion detected by the writing portion detection unit 14 is the writing portion 250, frames having a large difference continue to be consecutively accumulated every time writing is added, and thus the evaluation value β of extraction time is high.

In a case where the set portion detected by the writing portion detection unit 14 is the writer 300 or the like moving in front of the board surface 210, frames having a large difference are no longer accumulated when the writer 300 has passed through the front of the board surface 210. Thus, the number of consecutive frames is small and the evaluation value β of extraction time is low. However, if the writer 300 stops moving in front of the board surface 210, the evaluation value β of extraction time may become high even if the set portion is the writer 300.

Next, the writing portion detection unit 14 checks, for each detected set portion, the time during which there has been no change in pixels included in the set portion. That is, the writing portion detection unit 14 calculates a difference between a frame and another frame immediately before the frame among the current frame and the plurality of frames before the current frame for at least some or all of the pixels included in the set portion.

In addition, the writing portion detection unit 14 accumulates frames having a large difference from the immediately preceding frame, and sets the reciprocal of the difference as the evaluation value γ of stationary time, which is the time during which no change has appeared in the pixels included in the set portion. That is, the evaluation value γ of stationary time is higher as the number of frames having a small difference from the immediately preceding frame is larger, and the stationary time of each pixel is longer.

In a case where the set portion detected by the writing portion detection unit 14 is the writing portion 250, since no motion usually occurs in the writing portion written once, the difference from the immediately preceding frame is 0 or extremely small, and thus the evaluation value γ of stationary time is high.

In a case where the set portion detected by the writing portion detection unit 14 is the writer 300 or the like moving in front of the board surface 210 or performing an action such as a gesture, the difference from the immediately preceding frame is large and thus the evaluation value γ of stationary time is low.

The writing portion detection unit 14 substitutes each of the evaluation values α, β, and γ calculated as described above into an evaluation function E (α, β, γ) to obtain a solution, and detects a set portion in which the solution of the evaluation function E (α, β, γ) is greater than a threshold THr as the writing portion.

Then, the writing portion detection unit 14 determines, for each detected writing portion, whether to write and hold each pixel value of the writing portion to/at the corresponding pixel position of the current frame or to delete the pixel value without writing the pixel value to the corresponding pixel position of the current frame.

For example, in a case where the pixel position of the writing portion detected in the current frame coincides with the pixel position held as the writing portion in the previous frame, the writing portion detection unit 14 deletes each pixel value of the writing portion without writing the pixel value to the corresponding pixel position of the current frame. The reason is as follows.

In order to be detected as the writing portion in a predetermined frame, the solution of the evaluation function E ($\alpha$, $\beta$, $\gamma$) needs to be greater than the threshold THr, and such a state means that a great change has occurred at the pixel position. If such a great change occurs again at the pixel position previously held as the writing portion in the current frame, it is considered that such a state means that the previously written portion has been erased by the writer 300 or the like in the current frame.

For the above reason, the writing portion detection unit 14 deletes the writing portion detected at the same position as the pixel position previously detected as the writing portion from the current frame.

For other writing portions detected in the current frame, the writing portion detection unit 14 writes and holds each pixel value of the writing portion in the current frame. Alternatively, the writing portion detection unit 14 may hold only information of the pixel position of each pixel included in the writing portion, instead of writing the pixel value of the writing portion to the corresponding pixel position of the current frame.

The writing portion detection unit 14 sets a current frame for which the holding result and the deletion result of each pixel value of the writing portion have been reflected as a new reference frame. Such updating of the reference frame is performed, for example, for each of the board surfaces 210a to 210d.

In the case of a type in which the plurality of board surfaces 210a to 210d are simultaneously moved and replaced as in the whiteboard 200 of the embodiment, the reference frame may be updated for each of pairs of board surfaces that are moved at a time, that is, a pair of the board surfaces 210a and 210b or a pair of the board surfaces 210c and 210d.

The writing portion detection unit 14 uses the newly updated reference frame when performing detection of the writing portion for the next frame to the current frame.

With such processing, the writing portion detection unit 14 can perform different processing according to the movement determination result of the board surfaces 210a to 210d. A specific example thereof is illustrated in FIG. 6.

Figure 6:
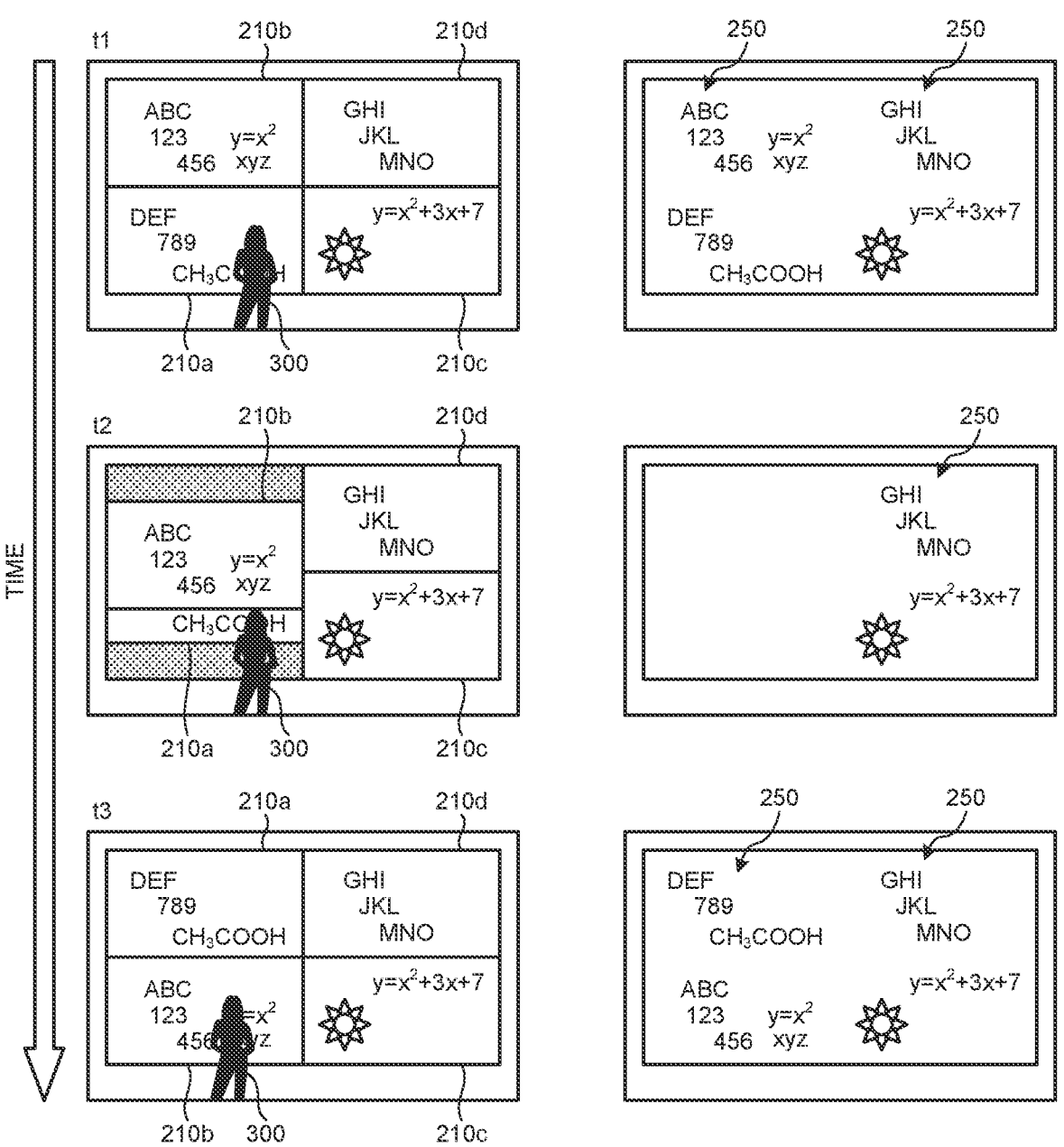
FIG. 6 is a diagram illustrating a detection result of the writing portion by the image processing device according to the first embodiment of the present disclosure, together with moving image data.

FIG. 6 is a diagram illustrating the detection result of the writing portion by the image processing device 10 according to the first embodiment of the present disclosure, together with the moving image data. FIG. 6 illustrates a frame of the moving image data and the detection result of the writing portion in the frame at each of times t1, t2, and t3. Here, the moving image data at times t1, t2, and t3 is the same as the moving image data at times t1, t2, and t3 in FIG. 4 described above.

At time t1 in FIG. 6, the writing portion detection unit 14 detects the writing portion 250 for each of the board surfaces 210a to 210d. At time t1, no movement occurs on any of the board surfaces 210a to 210d. In this case, the writing portion detection unit 14 detects the writing portion 250 for all the board surfaces 210a to 210d.

At time t2 in FIG. 6, movement occurs in the board surfaces 210a and 210b vertically arranged. In this case, the writing portion detection unit 14 makes detection processing of the writing portion 250 different according to the movement detection result of the individual board surfaces 210a to 210d.

More specifically, the writing portion detection unit 14 detects the writing portion 250 in a region corresponding to the board surfaces 210c and 210d whose movement has not been detected by the movement detection unit 13 in the frame of the moving image data at time t2 to hold and delete each pixel value of the detected writing portion 250 as necessary.

On the other hand, the writing portion detection unit 14 does not detect the writing portion 250 in a region corresponding to the board surfaces 210a and 210b whose movement has been detected by the movement detection unit 13 in the frame of the moving image data at time t2. In addition, the writing portion detection unit 14 deletes each pixel value held as the writing portion 250 of the board surfaces 210a and 210b in the previous frame from the current frame. Furthermore, the writing portion detection unit 14 deletes the reference frame of the board surfaces 210a and 210b at that time.

As described above, if the movement occurs in any of the board surfaces 210, each pixel included in the region greatly changes. For this reason, if a difference in the frame after the movement of the board surface 210 occurs is taken by referring to the reference frame before the movement of the board surface 210 occurs, a large difference is detected even in a portion other than the writing portion 250, which makes it difficult to correctly separate the writing portion 250 and the non-writing portion. By deleting the reference frame corresponding to the board surface 210 at the timing when the movement of the board surface 210 has been detected, the above-described erroneous detection can be suppressed.

Through this processing, as the detection result of the writing portion 250 at time t2, a state is obtained in which the left region corresponding to the board surfaces 210a and 210b does not have the writing portion 250, while the right region corresponding to the board surfaces 210c and 210d has the writing portion 250. Such a state as the detection result of the writing portion 250 is maintained until the movement of the board surfaces 210a and 210b ends.

When raising and lowering of the board surfaces 210a and 210b ends at time t3 in FIG. 6, the writing portion detection unit 14 starts the detection of the writing portion 250 for each of the board surfaces 210a to 210d again. In addition, the writing portion detection unit 14 newly registers the frame at that time as the reference frame.

(Processing Example of Image Processing Device)

Figure 7:
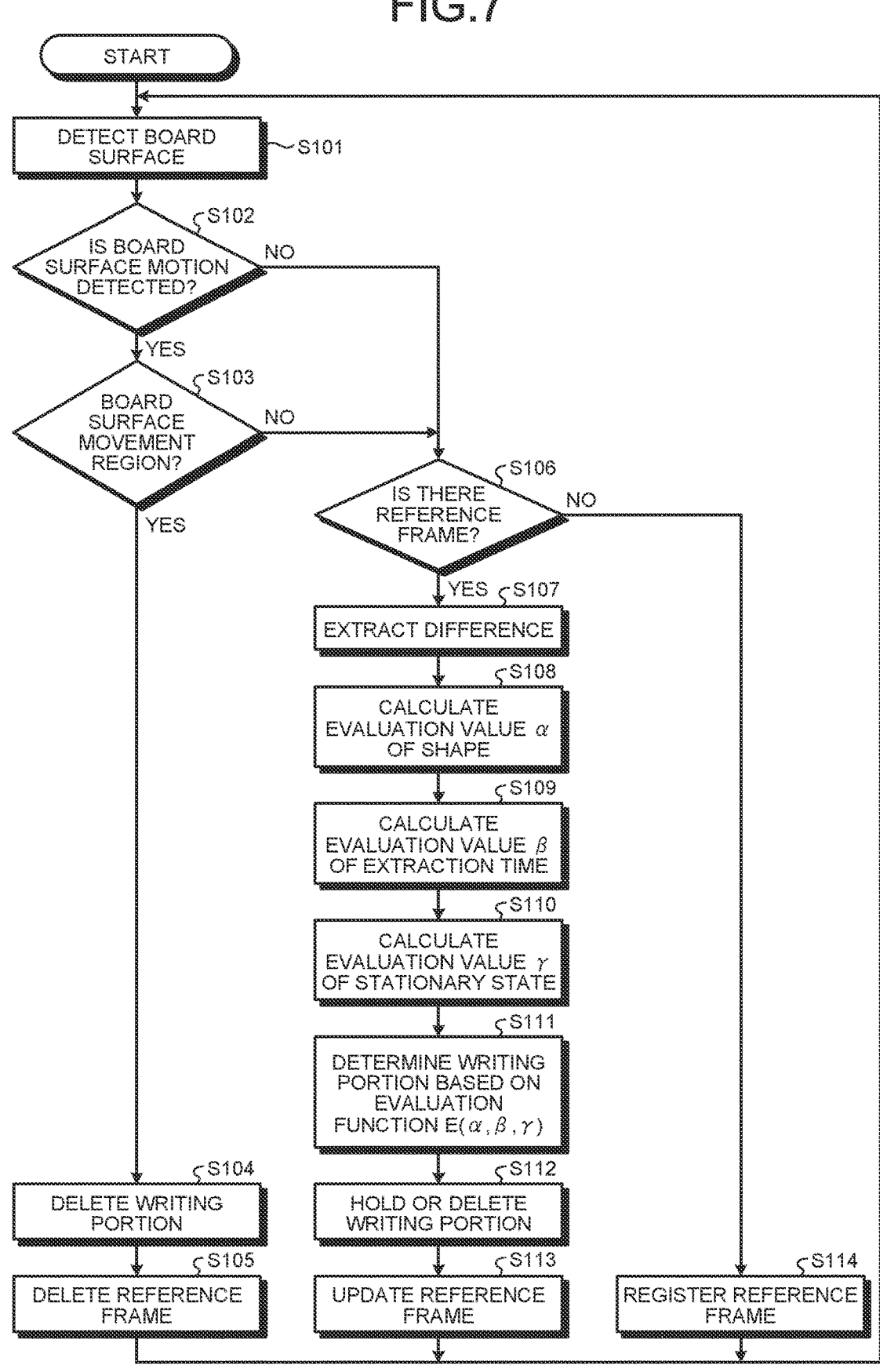
FIG. 7 is a flowchart illustrating an example of a procedure for image processing by the image processing device according to the first embodiment of the present disclosure.

Next, an example of image processing by the image processing device 10 of the first embodiment will be described with reference to FIG. 7. FIG. 7 is a flowchart illustrating an example of a procedure for image processing by the image processing device 10 according to the first embodiment of the present disclosure.

In the flowchart in FIG. 7, one cycle corresponds to processing for one predetermined frame constituting the moving image data, and when the processing for one frame is completed, cycles for subsequent frames are sequentially repeated.

As described above, in performing image processing, the image processing device 10 registers, as the initial reference frame, a reference frame that captures, for example, the board surfaces 210a to 210d before writing is started and before they are replaced with each other due to the raising and lowering movement. In other words, this processing can also be regarded as processing in Step S114 in FIG. 7.

That is, since the movement detection of the board surfaces 210a to 210d by the movement detection unit 13 (Step S101) does not detect the movement of any of the board surfaces 210a to 210d (Step S102: No), and there is no reference frame (Step S106: No) because of the initial stage of processing by the image processing device 10, the writing portion detection unit 14 registers the frame of the moving image data at that time as the reference frame (Step S114).

Then, processing returns to the beginning again, for example, in the next frame, the movement detection unit 13 performs the movement detection of the board surfaces 210a to 210d (Step S101) by detecting and tracking the straight line portion of the board surfaces 210a to 210d, and the writing portion detection unit 14 refers to whether or not the movement detection unit 13 has detected the movement of any of the board surfaces 210a to 210d (Step S102).

In the initial stage of processing by the image processing device 10, it is considered that the writer 300 or the like does not move the board surfaces 210a to 210d because nothing has been written on the board surfaces 210a and 210c arranged below or there is still a sufficient space to add writing, Thus, for example, in a case where the movement detection unit 13 has not detected the movement of any of the board surfaces 210a to 210d (Step S102: No), the writing portion detection unit 14 determines whether or not there is an already registered or updated reference frame (Step S106).

In a case where there is the reference frame (Step S106: Yes), the writing portion detection unit 14 extracts a set portion in which pixels having a large difference between the reference frame and the current frame concentrate (Step S107). At this time, the extracted set portion may include, in addition to the writing portion, the non-writing portion such as the writer 300 or the like performing some action.

The writing portion detection unit 14 calculates the evaluation value α of shape by comparing the outer quadrilateral and the inner quadrilateral for each set portion (Step S108). The evaluation value α of shape tends to be higher in the writing portion than in the non-writing portion such as the writer 300 extracted as the set portion, for example.

For each set portion, the writing portion detection unit 14 calculates the evaluation value β of extraction time from the number of consecutive frames having a large difference from the reference frame among the current frame and the plurality of frames before the current frame (Step S109). The extraction time at this time indicates the time during which a change has been continuously extracted in a predetermined set portion, and the evaluation value β of extraction time tends to be higher in the writing portion than in the non-writing portion.

For each set portion, the writing portion detection unit 14 calculates the evaluation value γ of stationary time from the reciprocal of the difference of a frame having a large difference from another frame immediately before the frame among the current frame and the plurality of frames before the current frame (Step S110). The stationary time at this time indicates the time during which no change has appeared in the pixels included in the set portion, and the evaluation value γ of stationary time tends to be higher in the writing portion than in the non-writing portion.

The writing portion detection unit 14 obtains a solution of the evaluation function E (α, β, γ) for each set portion, and determines a set portion in which the solution of the evaluation function E (α, β, γ) is greater than the threshold THr as the writing portion (Step S111).

The writing portion detection unit 14 determines whether to hold or delete the individual set portions determined to be the writing portion (Step S112). For example, in a case where the pixel position of the writing portion detected in the frame subject to the current processing coincides with the pixel position of the writing portion held in the previous frame, the writing portion detection unit 14 deletes the set portion without holding it, determining that the current detection result indicates that the previously written writing portion has been erased by the writer 300.

The writing portion detection unit 14 reflects the holding and deletion results for the individual set portions determined to be the writing portion in the frame subject to the current processing, and use the frame as a new reference frame to update the reference frame (Step S113).

As described above, since writing is performed exclusively on the board surfaces 210a and 210c arranged below for a while after the start of processing by the image processing device 10, it is considered that the movement of the board surfaces 210a to 210d does not occur, and processing in Steps S106 to S113 is repeated while the reference frame is sequentially updated.

Then, the lower board surfaces 210a and 210c are filled with the writing portions, and one of the board surfaces 210a to 210d is replaced at a predetermined timing.

Thus, for example, when the movement detection unit 13 detects the movement of any of the board surfaces 210a to 210d (Step S102: Yes), the writing portion detection unit 14 branches processing between the board surface 210 whose movement has occurred and the board surface 210 whose movement has not occurred (Step S103).

That is, in a case where the region to be processed from now on in a predetermined frame is the region corresponding to the board surface 210 where the current movement has occurred (Step S103: Yes), the writing portion detection unit 14 deletes the writing portion held in the region corresponding to the board surface 210 where the current movement has occurred in the previous frame (Step S104).

The writing portion detection unit 14 deletes the reference frame for the board surface 210 where the current movement has occurred (Step S105).

On the other hand, in a case where the region to be processed from now on in the predetermined frame is not the region corresponding to the board surface 210 where the current movement has occurred (Step S103: No), the writing portion detection unit 14 performs processing in Steps S106 to S113 as described above.

As described above, the writing portion detection unit 14 performs branched processing in Steps S103 to S113, so that the data up to that time is once reset in the region corresponding to the board surface 210 whose movement has occurred, and the data up to that time is maintained in the region corresponding to the board surface 210 whose movement has not occurred.

After that, when processing returns to the beginning again, for example, in the next frame, in a case where the movement has not occurred in any of the board surfaces 210a to 210d (Step S102: No), or in a case where no movement has occurred in the board surface 210 where the current movement has occurred (Step S103: No), the reference frame does not exist for the board surface 210 where the current movement has occurred (Step S105: No), and therefore the reference frame is registered again for the board surface 210 where the current movement has occurred (Step S114).

Then, image processing by the image processing device 10 of the first embodiment ends.

SUMMARY

In recent years, opportunities for recording lectures, training, seminars, and conferences, or the like are increasing in various scenes including education sites.

In such recording, a lecturer, a teacher, a presenter, or the like giving explanations by actually writing on a whiteboard, a blackboard, an electronic blackboard, or the like for the moment is often recorded, instead of giving explanations using presentation materials or the like, which is easily distributed as digital data.

For this reason, techniques for performing various image analysis and image processing on a recorded video including the whiteboard, the blackboard, the electronic blackboard, or the like have been proposed.

According to the image processing device 10 of the first embodiment, if the movement of the board surface 210 has been detected when separating the writing portion and the non-writing portion based on a change between the frames of the moving image data, processing corresponding to the movement of the board surface 210 is executed. As a result, image processing can be performed with high accuracy even in a case where writing is performed on the movable board surface 210.

According to the image processing device 10 of the first embodiment, if the movement of the board surface 210 has been detected, the detection result of the writing portion on the board surface 210 is deleted. As a result, the spread of the change between the frames to the entire board surface 210 or the entire screen of the moving image data due to the movement of the board surface 210 is suppressed, making it possible to accurately distinguish between the writing portion and the non-writing portion.

According to the image processing device 10 of the first embodiment, if the movement of the board surface 210 has been detected, the detection result of the writing portion on the board surface 210 whose movement has been detected is deleted, and the detection result of the writing portion on the board surface 210 whose movement has not been detected is held. As a result, it is possible to more accurately distinguish between the change between the frames due to the movement of the board surface 210 and the change between the frames due to the addition of writing or the like.

According to the image processing device 10 of the first embodiment, the movement of the board surface 210 is detected by detecting the straight line portion of the frame of the board surface 210 and detecting the movement of the straight line portion. As a result, the movement of the board surface 210 can be easily detected with high accuracy without requiring enormous data analysis or the like, for example. In addition, since the board surface 210 itself is directly detected, the movement of the board surface 210 can be detected, for example, even in the case of the board surface 210 on which writing is not performed.

According to the image processing device 10 of the first embodiment, for example, the straight line included in the writing portion and the frame of the board surface 210 are distinguished based on the length of the straight line portion. The length of the straight line portion of the frame of the board surface 210 can be determined based on the control information input from the input/output device 30 and the supplementary information including information such as the direction, number, configuration, arrangement, and color of the movement of the board surface 210. As a result, erroneous detection can be suppressed.

According to the image processing device 10 of the first embodiment, the detection result of the writing portion extracted with high accuracy as described above can be used for various purposes.

In the first embodiment described above, the whiteboard 200 includes the plurality of board surfaces 210*a* and 210*c*. However, a whiteboard or the like on which the writer performs writing may include only one board surface.

In the first embodiment described above, the whiteboard 200 is fixed to, for example, a wall surface of a building or the like. However, the whiteboard or the like on which the writer performs writing may be a caster-equipped whiteboard or the like that allows itself to be freely moved.

In the first embodiment described above, a blackboard, an electronic blackboard, or the like is used in addition to the whiteboard 200. However, a sheet-like paper medium such as poster paper attached to the whiteboard 200, the wall surface of a building, the blackboard, or the like may be used as a writing target.

In this case, the paper medium may be attached to the caster-equipped whiteboard or the like for a movable configuration. Alternatively, a plurality of paper media may be stacked and attached, and may be configured so as to be turned one by one every time writing on one paper medium is completed. Even in the case of such a configuration, in the first embodiment described above, it is possible to continue to correctly detect the writing portion on the paper medium in response to a great change that occurs in the video every time the paper medium filled with the writing portion is turned and the next new paper medium appears.

In the first embodiment described above, the detection result of the writing portion according to the movement of the board surface 210 is output to the recording device 40. However, the image processing device may output the moving image data received from the imaging device and the movement detection result of the board surface 210 to the recording device in association with each other.

First Modification

Next, an image processing device of a first modification of the first embodiment will be described with reference to FIG. 8. In the image processing device of the first modification, a method of detecting the movement of the board surfaces 210*a* to 210*d* is different from that of the first embodiment described above.

A movement detection unit of the image processing device of the first modification detects the movement of the board surfaces 210*a* to 210*d* by estimating the optical flow of the entire screen in a predetermined frame constituting the moving image data. In optical flow, for example, the motion of an object detected based on the luminance gradient is represented by a vector, and the motion of the object is estimated from the direction and size of the vector.

In a case where the movement of a predetermined board surface 210 is detected using optical flow, the writing portion that moves with the movement of the predetermined board surface 210 is detected based on the luminance gradient. Since the movement of the board surface 210 is usually performed after the board surface 210 is filled with the writing portion to some extent, the movement of the board surface 210 can be detected also by detecting the movement of the writing portion on the board surface 210 in this manner.

However, at this time, the writer 300 performing some action in front of the board surface 210 can also be detected. Therefore, the movement detection unit of the first modification groups the optical flows represented by the vectors into each vector group in which a predetermined number of vectors are concentrated. In addition, the movement detection unit of the first modification determines whether or not the detected movement is global from the size of the grouped vector group.

For example, in a case where the grouped vector group is a writing portion over substantially the entire board surface 210, the vector group has a predetermined collective size, and thus the detected movement should be global.

On the other hand, in a case where the grouped vector group is the writer 300 or the like standing in front of the board surface 210, the vector group is small and thus the detected movement should be local.

From the above, the movement detection unit of the first modification can identify the moving board surface 210 and the writer 300 performing some action, and can correctly detect the movement of the board surface 210.

In a case where the plurality of board surfaces 210 simultaneously move due to raising and lowering as in the whiteboard 200 described above, or in a case where the plurality of board surfaces simultaneously move in the horizontal direction due to lateral sliding, the movement detection unit of the first modification may detect the movement of the board surfaces 210 based on the detection of the global optical flow having the opposite vector.

Figure 8:
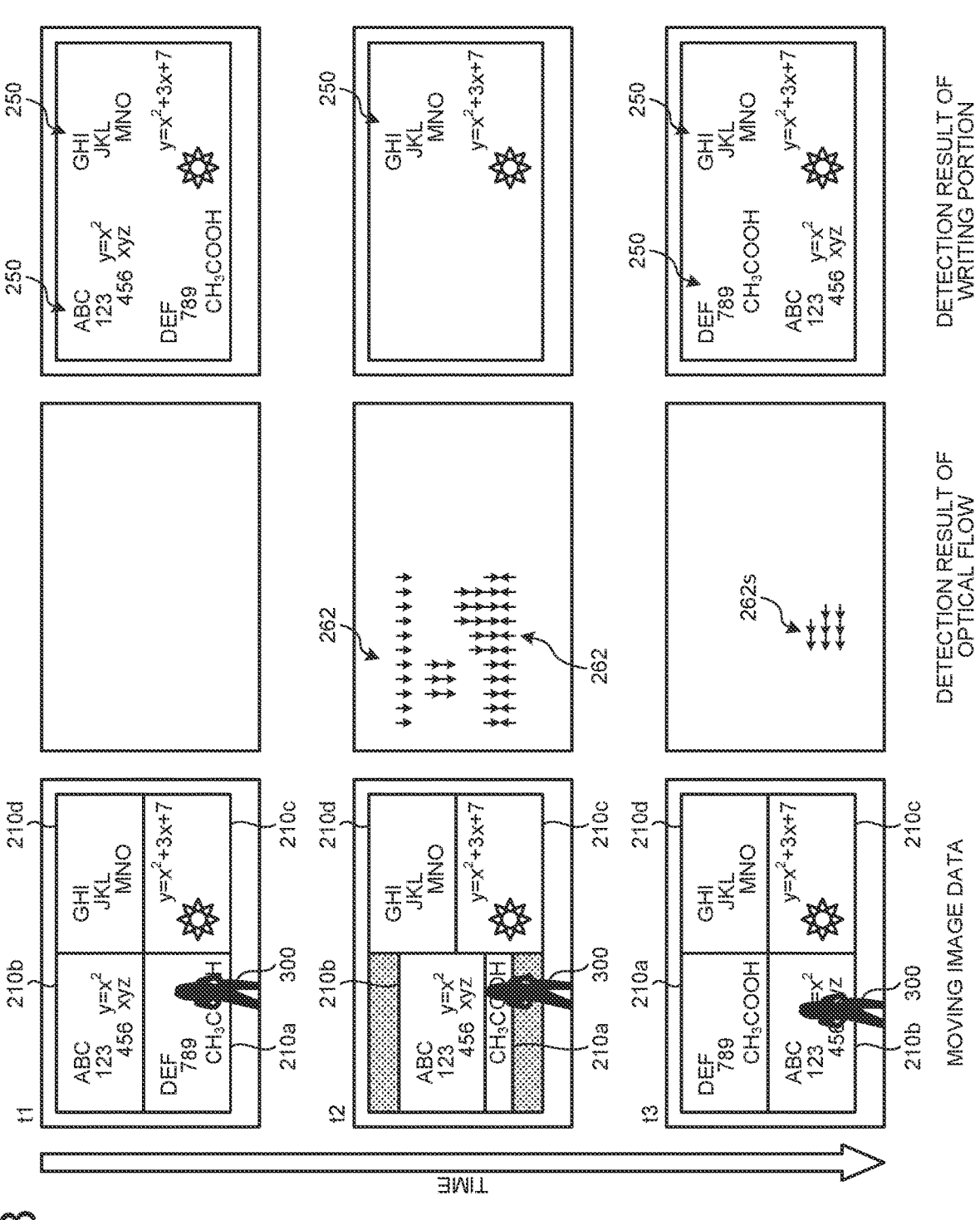
FIG. 8 is a diagram illustrating a movement detection result of a board surface by an image processing device according to a first modification of the first embodiment of the present disclosure, together with moving image data.

FIG. 8 is a diagram illustrating a movement detection result of the board surfaces 210a to 210d by the image processing device according to the first modification of the first embodiment of the present disclosure, together with the moving image data.

FIG. 8 illustrates a frame of the moving image data and the movement detection result of the board surfaces 210a to 210d in the frame at each of times t1, t2, and t3, together with a detection result of the writing portion for reference. The moving image data at times t1, t2, and t3 is the same as the moving image data at times t1, t2, and t3 in FIGS. 4 and 6 described above.

At time t1 in FIG. 8, writing is performed on the board surfaces 210a to 210d, but no movement occurs on any of the board surfaces 210a to 210d; thus, the movement detection unit of the first modification does not detect the movement of the board surfaces 210a to 210d using optical flow.

Since the movement of the board surfaces 210a to 210d is not detected, a writing portion detection unit of the first modification detects the writing portions 250 of all the board surfaces 210a to 210d. Then, the detection result of the writing portion 250 at time t1 is obtained.

At time t2 in FIG. 8, when the board surfaces 210a and 210b vertically arranged are moving due to raising and lowering, the movement detection unit of the first modification detects the optical flow 262 having a vector in the vertically opposite direction from the actual movement of the writing portion recorded in the moving image data, and determines that the movement of the board surfaces 210a and 210b has occurred because the optical flow is global.

Since the movement of the board surfaces 210a and 210b has been detected, the writing portion detection unit of the first modification deletes the detection result of the writing portion 250 of the board surfaces 210a and 210b, and holds the detection result of the writing portion 250 of the board surfaces 210c and 210d that remain stationary. Then, the detection result of the writing portion 20 at time t2 is obtained.

At time t3 in FIG. 8, the moving image data includes the board surfaces 210a to 210d all of which are in the stationary state again, and the writer 300 moving in front of the board surfaces 210a to 210d. Therefore, the movement detection unit of the first modification detects the optical flow 262s due to the movement of the writer 300.

However, the optical flow 262s is not global, and the direction of movement is the lateral direction, which is different from the direction of the board surfaces 210a to 210d that move vertically. Therefore, the movement detection unit of the first modification determines that the optical flow 262s is not the movement of the board surfaces 210a and 210b.

Since the movement of the board surfaces 210a and 210b ends at time t3, the writing portion detection unit of the first modification detects the writing portions 250 of all the board surfaces 210a to 210d again. Then, the detection result of the writing portion 250 at time t3 is obtained.

As described above, the same detection result of the writing portion 250 as in the case of the above-described first embodiment can be obtained also by the movement detection of the board surfaces 210a to 210d using optical flow.

According to the image processing device of the first modification, the movement of the board surface 210 is detected by estimating the optical flow for the movement of the writing portion associated with the movement of the board surface 210. As a result, the movement of the board surface 210 can be easily detected without requiring enormous data analysis or the like, for example. In addition, using the optical flow makes it possible to detect even fine motion and slow motion of less than one pixel, for example. Furthermore, the movement of the board surface can be detected even in a case where the frame of the board surface does not appear as a clear edge on the image and in a case where the board surface is curved.

According to the image processing device of the first modification, the optical flows are grouped and a distinct is made between the movement of the writer 300 and the movement of the board surface 210 based on the size and the movement direction of the grouped region. The size, the movement direction, and the like of the board surface 210 can be determined based on the control information input from the input/output device 30 and the supplementary information including information such as the direction, number, configuration, arrangement, and color of the movement of the board surface 210. As a result, erroneous detection can be suppressed.

Second Modification

Next, an image processing device of a second modification of the first embodiment will be described with reference to FIG. 9. In the image processing device of the second modification, a method of detecting the movement of the board surfaces 210a to 210d is different from that of the first embodiment described above.

A movement detection unit of the image processing device of the second modification detects the movement of the board surfaces 210a to 210d using general object recognition in a predetermined frame constituting the moving image data. In general object recognition, for example, an object included in a video is recognized by a general name, and the motion of the object is detected by tracking a position of the recognized object. In order to cause an object to be recognized by a general name, for example, a method such as machine learning is used.

In a case where the movement of the board surfaces 210*a* to 210*d* is detected using general object recognition, the board surfaces 210*a* to 210*d* that can be individually moved are each recognized by a general name such as a "whiteboard", and the positions thereof are tracked based on a change between the frames of the positions. However, the movement detection unit of the second modification may detect the movement of the "whiteboard" by tracking not a position but the center of gravity of the object recognized as the "whiteboard", that is, the center of gravity of the board surfaces 210*a* to 210*d*.

At this time, it is preferable to learn an object that can be included in the moving image data in addition to the board surfaces 210*a* to 210*d*, for example, by causing the writer 300 or the like to be recognized by a general name such as a "person".

Figure 9:
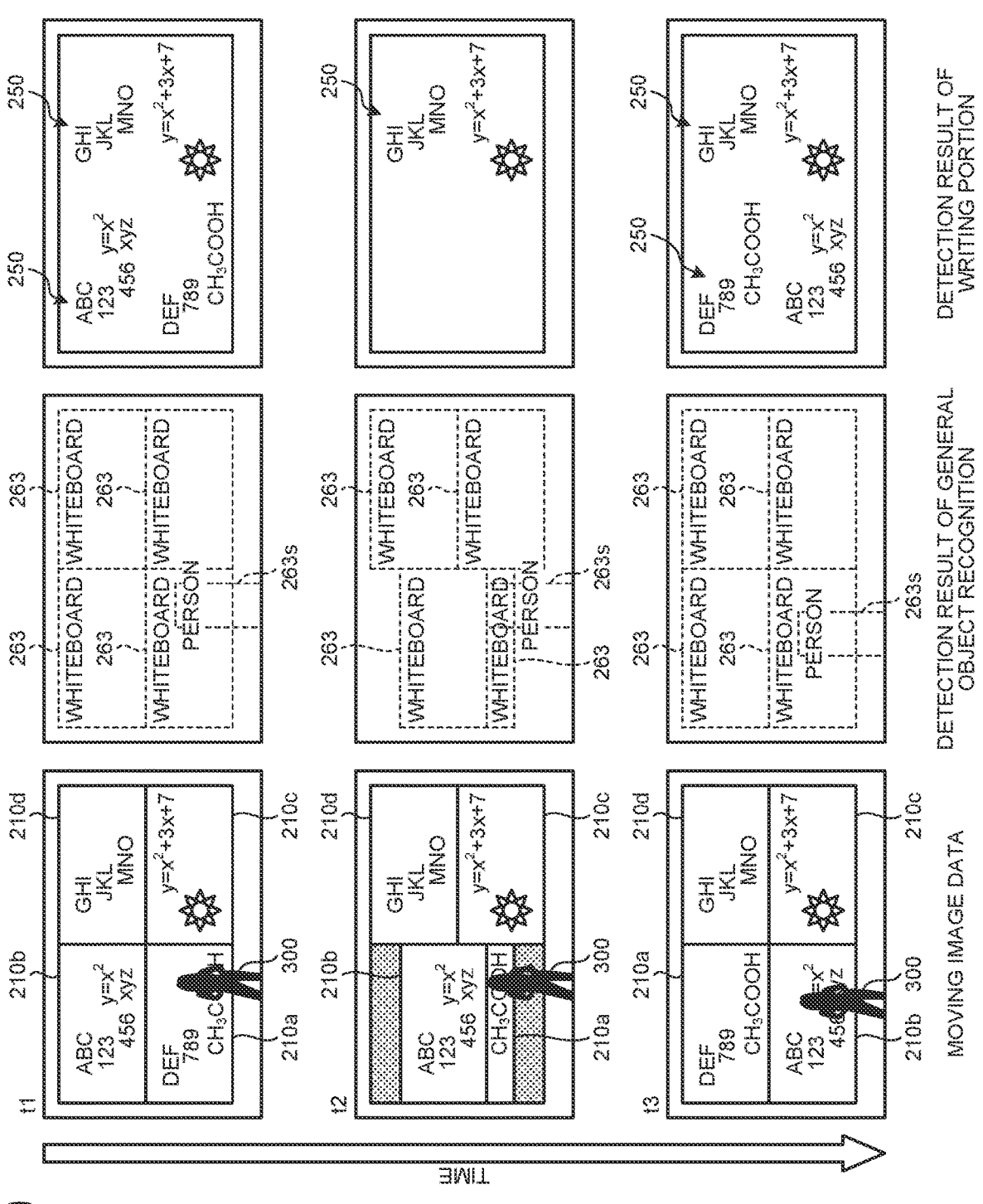
FIG. 9 is a diagram illustrating a movement detection result of a board surface by an image processing device according to a second modification of the first embodiment of the present disclosure, together with moving image data.

FIG. 9 is a diagram illustrating a movement detection result of the board surfaces 210*a* to 210*d* by the image processing device according to the second modification of the first embodiment of the present disclosure, together with the moving image data.

FIG. 9 illustrates a frame of the moving image data and the movement detection result of the board surfaces 210*a* to 210*d* in the frame at each of times t1, t2, and t3, together with a detection result of the writing portion for reference. The moving image data at times t1, t2, and t3 is the same as the moving image data at times t1, t2, and t3 in FIGS. 4 and 6 described above.

At time t1 in FIG. 9, the movement detection unit of the second modification recognizes each of the board surfaces 210*a* to 210*d* included in the moving image data as a "whiteboard" 263, and similarly recognizes the writer 300 included in the moving image data as a "person" 263*s*. Thereafter, the movement detection unit of the second modification starts tracking the positions of the "whiteboard" 263 and the "person" 263*s*.

Since the movement of the board surfaces 210*a* to 210*d* recognized as the "whiteboard" 263 is not detected at time t1, a writing portion detection unit of the second modification detects the writing portions 250 of all the board surfaces 210*a* to 210*d*. Then, the detection result of the writing portion 250 at time t1 is obtained.

When the board surfaces 210*a* and 210*b* vertically arranged are moving due to raising and lowering at time t2 in FIG. 9, the movement detection unit of the second modification determines that the movement of the board surfaces 210*a* and 210*b* has occurred according to a change in the position of the "whiteboard" 263 corresponding to the board surfaces 210*a* and 210*b*.

Since the movement of the board surfaces 210*a* and 210*b* has been detected, the writing portion detection unit of the second modification deletes the detection result of the writing portion 250 of the board surfaces 210*a* and 210*b*, and holds the detection result of the writing portion 250 of the board surfaces 210*c* and 210*d* that remain stationary. Then, the detection result of the writing portion 250 at time t2 is obtained.

At time t3 in FIG. 9, the moving image data includes the board surfaces 210*a* to 210*d* all of which are in the stationary state again, and the writer 300 moving in front of the board surfaces 210*a* to 210*d*. Therefore, the movement detection unit of the second modification determines that the movement of the "person" 263*s*, who is the writer 300, has occurred and the movement of the "whiteboard" 263, which is the board surfaces 210*a* to 210*d*, has ended.

Since the movement of the board surfaces 210*a* and 210*b* has ended, the writing portion detection unit of the second modification detects the writing portions 250 of all the board surfaces 210*a* to 210*d* again. Then, the detection result of the writing portion 250 at time t3 is obtained.

As described above, the same detection result of the writing portion 250 as in the case of the above-described first embodiment can be obtained also by the movement detection of the board surfaces 210*a* to 210*d* using general object recognition.

According to the image processing device of the second modification, the board surfaces 210*a* to 210*d* are recognized by general object recognition, and the movement of the board surfaces 210*a* to 210*d* is detected by tracking the position or the center of gravity of the board surfaces 210*a* to 210*d*. As a result, the movement of the board surfaces 210*a* to 210*d* can be detected with high accuracy.

According to the image processing device of the second modification, a distinct is made between the movement of the writer 300 and the movement of the board surfaces 210*a* to 210*d* by recognizing the writer 300 as well using general object recognition. As a result, erroneous detection can be suppressed.

Third Modification

Next, an image processing device of a third modification of the first embodiment will be described. The image processing device of the third modification is different from the first embodiment described above in that the image processing device has a function of tracking the moving plate surface.

A movement detection unit of the image processing device of the third modification detects movement of a predetermined board surface using straight line detection of the frame of the board surface, optical flow detection of the writing portion on the board surface, general object recognition of the board surface, or the like, as described above.

In addition, the movement detection unit of the third modification changes the angle of view of the imaging device 20 using a control signal for controlling the imaging device 20 in a case where the board surface whose movement has been detected continues to move out of the frame of the moving image data.

More specifically, the movement detection unit of the third modification causes the imaging device 20 to perform imaging at a wider angle of view. Such control is possible in a case where the imaging device 20 has, for example, an optical or electronic zoom-up function and a zoom-back function. As described above, widening the angle of view of the imaging device 20 enables a wider range of imaging, and enables the board surface that has moved out of the frame of the moving image data to be captured in the frame again.

Alternatively, the movement detection unit of the third modification causes the imaging device 20 to move the angle of view in at least one of the horizontal direction and the vertical direction. Such control is possible in a case where the imaging device 20 has, for example, a function of mechanically panning and tilting. The direction of the movement (pan/tilt) of the angle of view can be determined based on the movement direction of the board surface detected by the movement detection unit of the third modification immediately before the board surface moves out of the frame. As described above, moving the angle of view of the imaging device 20 enables the angle of view to be directed in the direction of the movement of the board surface, and enables the board surface that has moved out of the frame of the moving image data to be captured in the frame again.

Alternatively, the movement detection unit of the third modification causes the imaging device 20 to perform imaging at a wider angle of view while moving the angle of view in at least one of the horizontal direction and the vertical direction. This enables the board surface that has moved out of the frame of the moving image data to be captured in the frame again, and enables the board surface to be imaged at a more appropriate angle of view.

The configuration of the movement detection unit of the third modification is suitably applied to, for example, a case where it becomes difficult to capture the entire whiteboard 200 within the frame because the writing portion on a predetermined board surface 210 of the above-described whiteboard 200 is enlarged for display.

Furthermore, the configuration of the movement detection unit of the third modification is suitably applied to a case where the direction and range of the movement are irregular and relatively wide, for example, as in a caster-equipped whiteboard or the like.

According to the image processing device of the third modification, the angle of view of the imaging device 20 is changed in a case where the board surface has moved out of the frame of the moving image data. As a result, it is possible to continue to capture the board surface within the frame of the moving image data, and continue the detection of the writing portion on the board surface.

Second Embodiment

A second embodiment will be described with reference to the drawings. In the second embodiment, an image processing device having a function of superimposing a detected writing portion on moving image data imaged by an imaging device 20 will be described as an example of the use of the detection result of the writing portion obtained as in the first embodiment or the first to third modifications described above. Such superimposition processing improves the visibility of the writing portion.

(Configuration Example of Image Processing Device)

Figure 10:
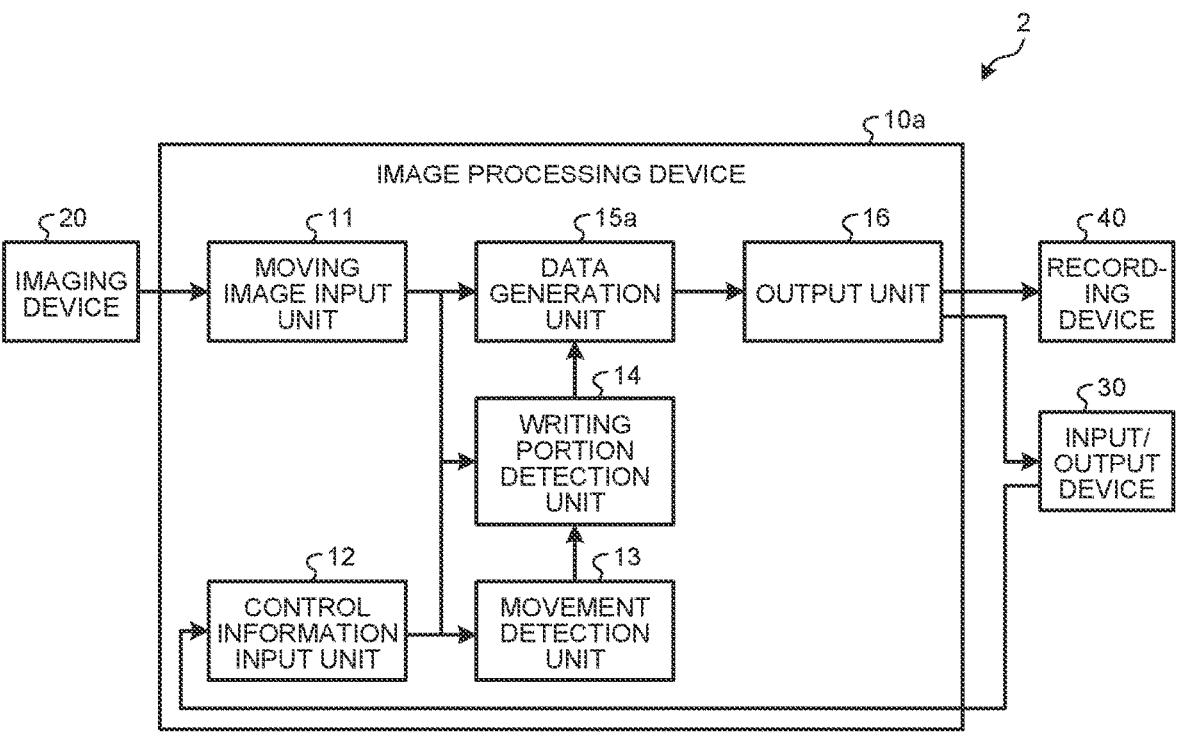
FIG. 10 is a block diagram illustrating an example of a functional configuration of an image processing device according to a second embodiment of the present disclosure.

FIG. 10 is a block diagram illustrating an example of a functional configuration of an image processing device 10a according to the second embodiment of the present disclosure.

As illustrated in FIG. 10, the image processing device 10a is connected to one or more imaging devices 20, input/output devices 30, and recording devices 40, and constitutes a part of an image processing system 2 of the second embodiment. The image processing device 10a of the second embodiment is also a computer including, for example, a CPU, a ROM, a RAM, and an I/O port.

In addition, the image processing device 10 of the second embodiment includes a data generation unit 15a in addition to a moving image input unit 11, a control information input unit 12, a movement detection unit 13, a writing portion detection unit 14, and an output unit 16, which are the same functional configuration as that of the first embodiment described above.

However, the image processing device 10a may include, instead of the movement detection unit 13 that detects the movement of the board surfaces 210a to 210d using straight line detection, the movement detection unit of the first modification or the second modification of the first embodiment described above that detects the movement of the board surfaces 210a to 210d using optical flow, general object recognition, or the like.

The data generation unit 15a generates the writing data based on a detection result of the writing portion acquired from the writing portion detection unit 14. In addition, the data generation unit 15a superimposes the generated writing data on the moving image data received from the moving image input unit 11 to generate composite moving image data. Through the series of processing, the data generation unit 15a refers to control information received from the control information input unit 12.

The output unit 16 outputs the composite moving image data generated by the data generation unit 15a to one or more input/output devices 30 and one or more recording devices 40 connected to the image processing device 10a. As a result, the user can view the composite moving image data with the input/output device 30.

(Example of Data Generation Operation)

Next, generation operation of the writing data and the composite moving image data by the image processing device 10a according to the second embodiment will be described with reference to FIG. 11.

Figure 11:
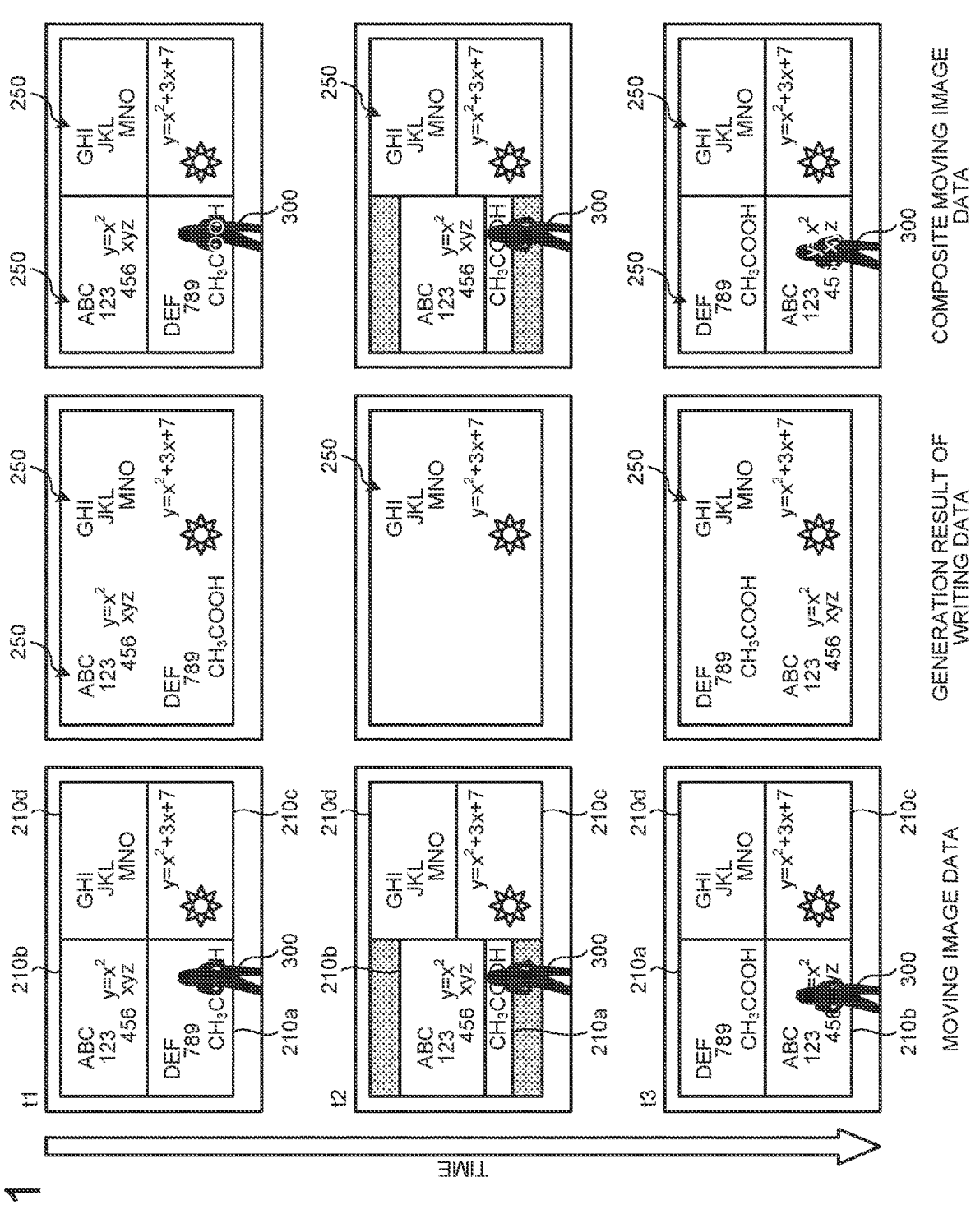
FIG. 11 is a diagram illustrating a generation result of writing data and composite moving image data by the image processing device according to the second embodiment of the present disclosure, together with moving image data.

FIG. 11 is a diagram illustrating a generation result of the writing data and the composite moving image data by the image processing device 10a according to the second embodiment of the present disclosure, together with the moving image data. FIG. 11 illustrates a frame of the moving image data, and the generation result of the writing data and the generation result of the composite moving image data in the frame at each of times t1, t2, and t3.

The moving image data at times t1, t2, and t3 is the same as the moving image data at times t1, t2, and t3 in FIGS. 4 and 6 of the first embodiment described above, and it is thus assumed that the same movement detection result of the board surfaces 210a to 210d and the same generation result of the writing data as those in FIGS. 4 and 6 of the first embodiment described above are obtained.

At time t1 in FIG. 11, the data generation unit 15a of the image processing device 10a extracts the detection result of the writing portion 250 by the writing portion detection unit 14 and generates the writing data. Since no movement has occurred on any of the board surfaces 210a to 210d at time t1, the data generation unit 15a generates the writing data including the writing portion 250 on all the board surfaces 210a to 210d. In addition, the data generation unit 15a superimposes the generated writing data on the moving image data at time t1 to generate composite moving image data.

The moving image data at time t1 includes the board surfaces 210a to 210d in a stationary state and a writer 300 standing in front of the board surfaces 210a to 210d. In addition, the writing data at time t1 includes the writing portions 250 written on the individual board surfaces 210a to 210d as described above. The writing data is superimposed on the moving image data so as to overlap the actual writing portion appearing in the moving image data.

As a result, in the composite moving image data at time t1, the writing portion hidden by the writer 300 is superimposed on the video of the writer 300 while the positional relationship between the writer 300 and the writing portion is maintained, thus improving the visibility of the writing portion 250.

Similarly at time t2 in FIG. 11, the data generation unit 15a extracts the detection result of the writing portion 250 by the writing portion detection unit 14 to generate the writing data.

At time t2, movement occurs in the board surfaces 210a and 210b vertically arranged. Therefore, the data generation unit 15a extracts data of each pixel value of the writing portion 250 held by the writing portion detection unit 14 from the region corresponding to the board surfaces 210c and 210d whose movement has not been detected, and reflects the data in the writing data to be generated.

In addition, since the writing portion 250 is deleted by the writing portion detection unit 14 from the region corresponding to the board surfaces 210a and 210b where the movement is detected, the data generation unit 15a reflects the state as it is in the writing data.

As a result, in the writing data at time t2, the left region corresponding to the board surfaces 210a and 210b does not have the writing portion 250, while the right region corresponding to the board surfaces 210c and 210d has the writing portion 250. Such a state of the writing data is maintained until the movement of the board surfaces 210a and 210b ends.

The data generation unit 15a superimposes the writing data generated as described above on the moving image data at time t2 to generate composite moving image data.

The moving image data at time t2 includes the board surfaces 210a and 210b that are moving, the board surfaces 210c and 210d that remain stationary, and the writer 300 standing in front of the board surfaces 210a to 210d. In addition, the writing data at time t2 does not include the writing portion written on the board surfaces 210a and 210b that are moving, and includes only the writing portion 250 written on the board surfaces 210c and 210d, as described above.

Therefore, when the writing data at time t2 is superimposed on the moving image data at time t2, in the composite moving image data at time t2, the writing portion is not superimposed on the board surfaces 210a and 210b, and the writing portion appearing in the moving image data is displayed as it is. Therefore, the writing portion behind the writer 300 standing in front of the board surfaces 210a and 210b remains hidden by the writer 300.

On the other hand, the writing portion 250 included in the writing data is superimposed on the video of the writer 300 on the board surfaces 210c and 210d.

At time t3 in FIG. 11 as well, the data generation unit 15a extracts the detection result of the writing portion 250 by the writing portion detection unit 14 to generate the writing data. Since raising and lowering of the board surfaces 210a and 210b ends at time t3, the data generation unit 15a generates the writing data including the writing portions 250 of all the board surfaces 210a to 210d again. In addition, the data generation unit 15a superimposes the generated writing data on the moving image data at time t3 to generate composite moving image data.

The moving image data at time t3 includes the board surfaces 210a to 210d all of which are in the stationary state again, and the writer 300 standing in front of the board surfaces 210a to 210d. In addition, the writing data at time t3 includes the writing portions 250 on all the board surfaces 210a to 210d as described above.

Therefore, when the writing data at time t3 is superimposed on the moving image data at time t3, the writing portion 250 is superimposed on all the board surfaces 210a to 210d in the composite moving image data at time t3. As a result, the writing portion hidden by the writer 300 is superimposed on the video of the writer 300, thus improving the visibility of the writing portion 250.

(Processing Example of Image Processing Device)

Figure 12:
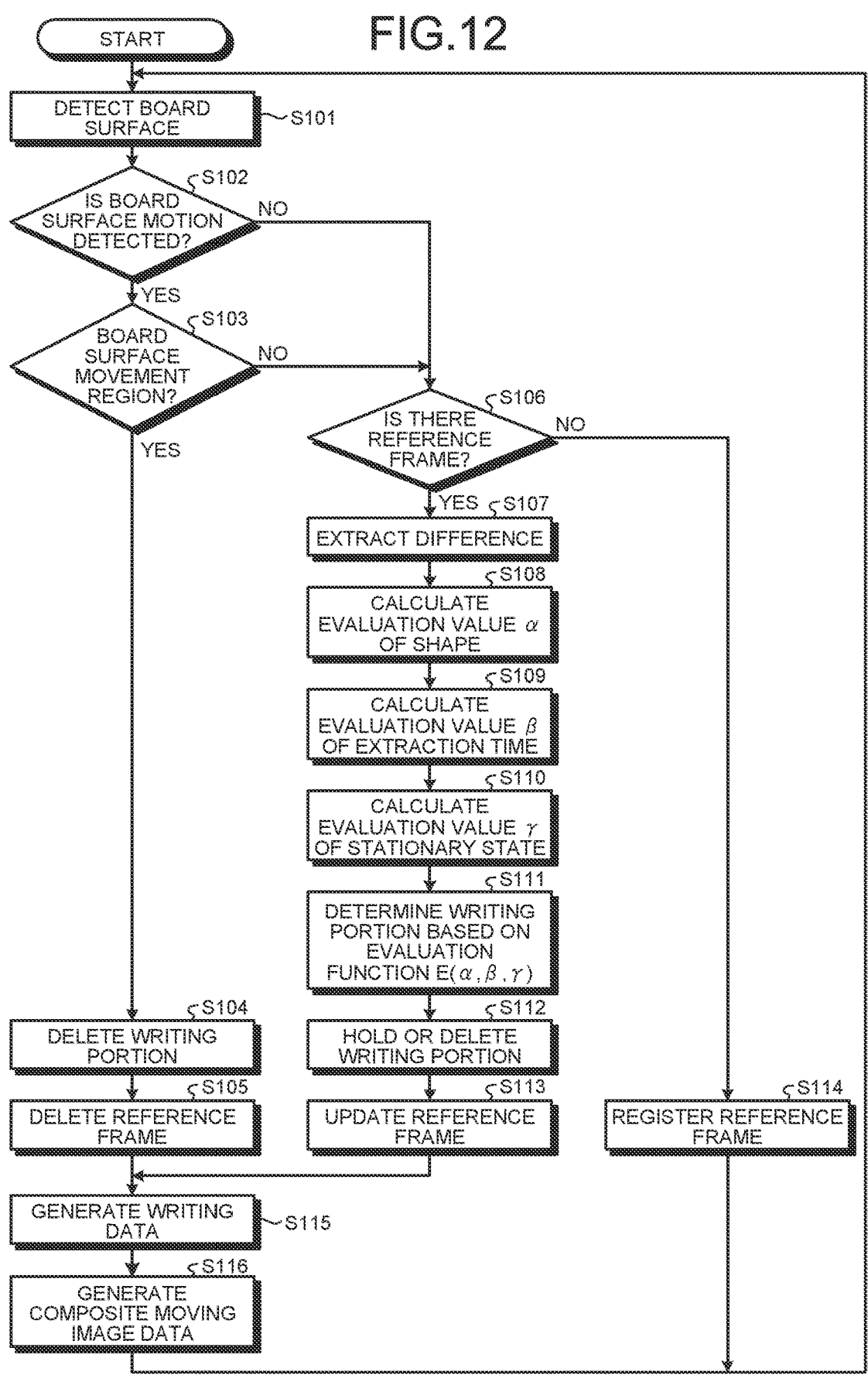
FIG. 12 is a flowchart illustrating an example of a procedure for image processing by the image processing device according to the second embodiment of the present disclosure.

Next, an example of image processing by the image processing device 10a of the second embodiment will be described with reference to FIG. 12. FIG. 12 is a flowchart illustrating an example of a procedure for image processing by the image processing device 10a according to the second embodiment of the present disclosure.

In the flowchart in FIG. 12, processing in Steps S101 to S114 is the same as processing in Steps S101 to S114 in FIG. 8 of the first embodiment described above.

That is, in a case where the movement detection of the board surfaces 210a to 210d by the movement detection unit 13 (Step S101) does not detect the movement of all or some of the board surfaces 210 (Step S102 or Step S103: No), and there is no reference frame (Step S106: No) before the registration of the first reference frame in the initial stage of processing by the image processing device 10a or immediately after the reference frame is deleted because the movement of the board surfaces 210a to 210d occurs in the previous frame, the writing portion detection unit 14 registers the frame of the moving image data at that time as the reference frame (Step S114). Then, processing returns to the beginning again, for example, in the next frame.

In a case where there is the reference frame (Step S106: Yes) in the above case (Step S102 or Step S103: No), the writing portion detection unit 14 detects the writing portion, and reflects the holding and deleting results for the individual set portions determined to be the writing portion in the frame to be processed to update the reference frame (Steps S107 to S113).

The data generation unit 15a generates the writing data based on processing in Steps S107 to S113 by the writing portion detection unit 14 (Step S115).

The data generation unit 15a superimposes the generated writing data on the frame of the moving image data subject to the current processing (Step S116). Then, processing returns to the beginning again, for example, in the next frame.

In a case where the movement of any of the board surfaces 210a to 210d has been detected (Step S102: Yes), and the region to be processed from now on is the region corresponding to the board surface 210 where the current movement has occurred (Step S103: Yes), the writing portion detection unit 14 deletes the writing portion held in the region corresponding to the board surface 210 where the current movement has occurred in the previous frame and the reference frame of the board surface 210 where the current movement has occurred (Steps S104 to S105).

Based on processing in Steps S104 to S105 and processing in Steps S107 to 3113 by the writing portion detection unit 14, the composite moving image generation unit 15 generates the writing data not having the writing portion in the region corresponding to the board surface 210 whose movement has occurred and having the writing portion in the region corresponding to the board surface 210 whose movement has not occurred (Step S115).

The composite moving image generation unit 15 superimposes the generated writing data on the frame of the moving image data subject to the current processing (Step S116).

Then, image processing by the image processing device 10a of the second embodiment ends.

SUMMARY

According to the image processing device 10a of the second embodiment, the writing data is generated based on the detection result of the writing portion, and the composite moving image data is generated by superimposing the writing data on the moving image data. As a result, it is possible to enhance the visibility of the writing portion in a case where a recorded content such as lecture notes and meeting minutes are viewed.

Third Embodiment

A third embodiment will be described with reference to the drawings. In the third embodiment, an image processing device having a function of generating a writing log will be described as another example of the use of a detection result of the writing portion obtained as in the first embodiment or the first to third modifications described above.
(Configuration Example of Image Processing Device)

Figure 13:
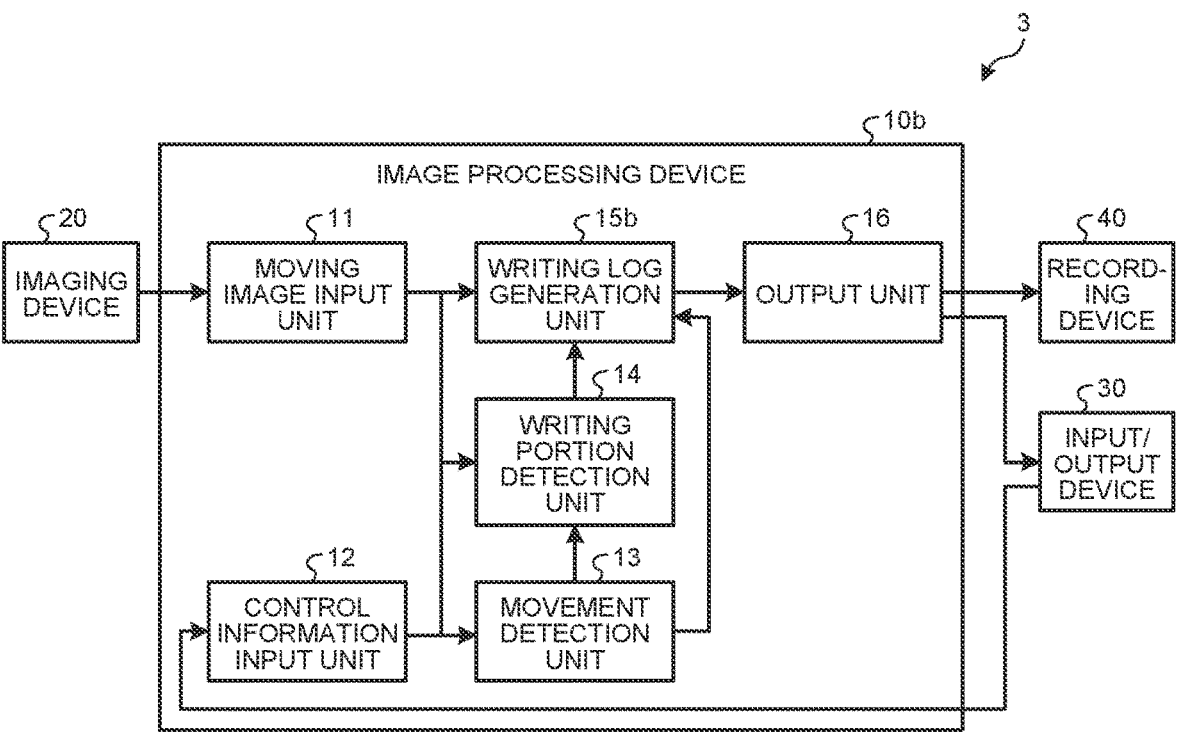
FIG. 13 is a block diagram illustrating an example of a functional configuration of an image processing device according to a third embodiment of the present disclosure.

FIG. 13 is a block diagram illustrating an example of a functional configuration of an image processing device 10*b* according to the third embodiment of the present disclosure.

As illustrated in FIG. 13, the image processing device 10*b* is connected to one or more imaging devices 20, input/output devices 30, and recording devices 40, and is configured as a part of an image processing system 3 of the third embodiment. The image processing device 10*b* of the third embodiment is also a computer including, for example, a CPU, a ROM, a RAM, and an I/O port.

In addition, the image processing device 10*b* includes a writing log generation unit 15*b* in addition to a moving image input unit 11, a control information input unit 12, a movement detection unit 13, a writing portion detection unit 14, and an output unit 16, which are the same functional configuration as that of the image processing device 10 of the first embodiment described above.

However, the image processing device 10*b* may include, instead of the movement detection unit 13 that detects the movement of the board surfaces 210*a* to 210*d* using straight line detection, the movement detection unit of the first modification or the second modification of the first embodiment described above that detects the movement of the board surfaces 210*a* to 210*d* using optical flow, general object recognition, or the like.

The writing log generation unit 15*b* acquires a movement detection result of the board surfaces 210*a* to 210*d* from the movement detection unit 13, acquires the detection result of the writing portion by the writing portion detection unit 14 in the frame immediately before the timing at which the movement of at least one of the board surfaces 210*a* to 210*d* has been detected, and stores the detection result as the writing log. The writing log generation unit 15*b* adds the writing log generated in this manner to the moving image data acquired from the moving image input unit 11 and passes the writing log to the output unit 16. As a result, the user can view the moving image data to which the writing log is added with the input/output device 30.
(Example of Generation Operation of Writing Log)

Next, generation operation of the writing log by the image processing device 10*b* of the third embodiment will be described with reference to FIG. 14.

Figure 14:
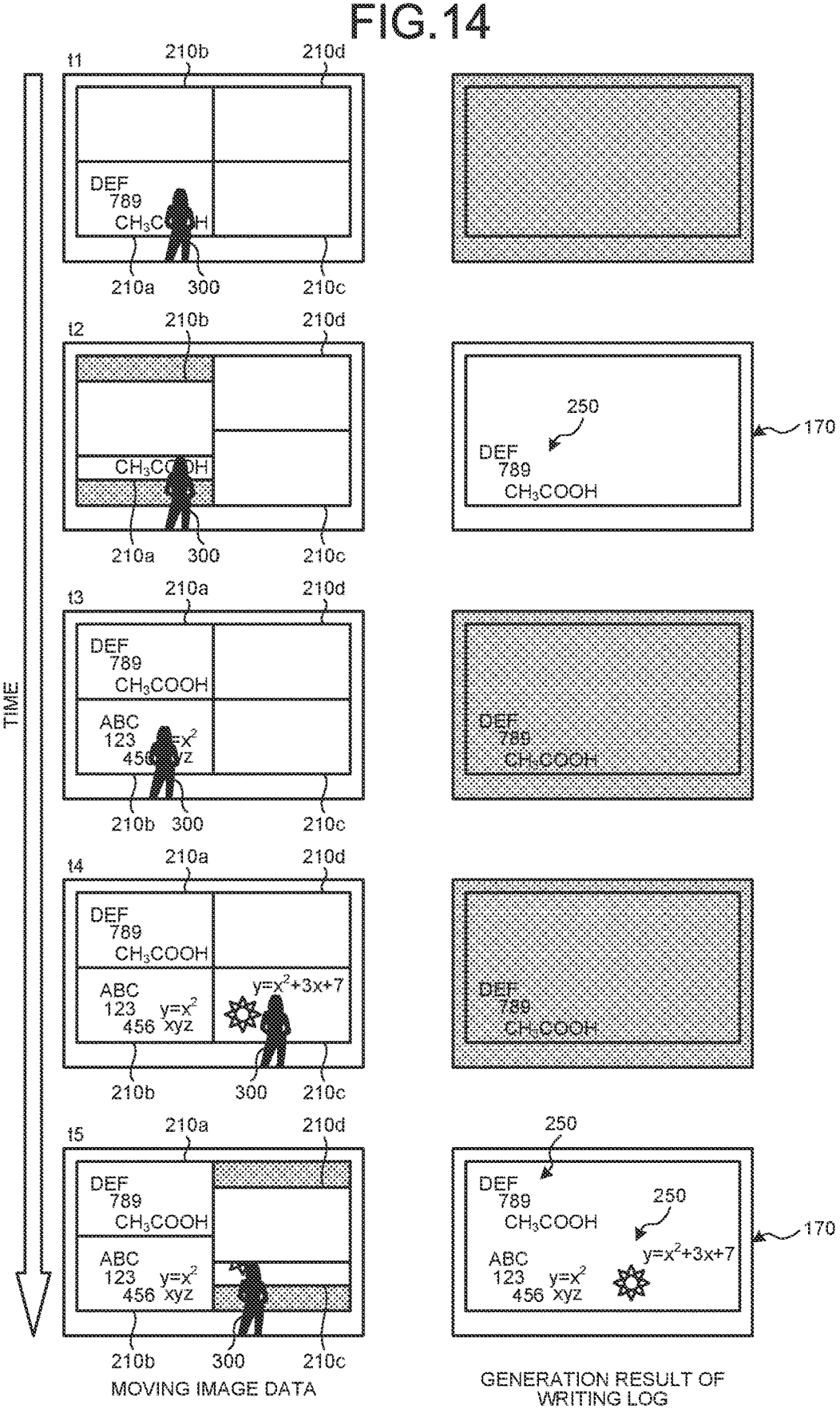
FIG. 14 is a diagram illustrating a generation result of a writing log by the image processing device according to the third embodiment of the present disclosure, together with moving image data.

FIG. 14 is a diagram illustrating a generation result of the writing log by the image processing device 10*b* according to the third embodiment of the present disclosure, together with moving image data. FIG. 14 illustrates a frame of the moving image data at each of times t1, t2, t3, t4, and t5 and the generation result of the writing log at a predetermined timing among times t1, t2, t3, t4, and t5.

At time t1 in FIG. 14, the writer 300 is writing an explanation content or the like exclusively using the board surface 210*a* among the board surfaces 210*a* to 210*d*.

At time t2 in FIG. 14, the writer 300 has completed writing on the board surface 210*a* and is performing replace-ment by raising and lowering the board surfaces 210*a* and 210*b*. The movement detection unit 13 detects the movement of the board surfaces 210*a* and 210*b*.

When the movement of the board surfaces 210*a* and 210*b* is detected, the writing log generation unit 15*b* acquires the detection result of the writing portion 250 in the frame immediately before the movement detection from the writing portion detection unit 14. In the frame immediately before the movement of the board surfaces 210*a* and 210*b* is detected, since the movement does not occur in any of the board surfaces 210*a* to 210*d*, the writing portion detection unit 14 detects and holds the writing portion 250 written on the board surface 210*a*.

The writing log generation unit 15*b* generates the writing log 170 including the writing portion 250 written on the board surface 210*a* from the detection result of the writing portion 250 acquired from the writing portion detection unit 14, and associates the writing log with the frame at time t2.

At time t3 in FIG. 14, the writer 300 is writing an explanation content or the like exclusively using the board surface 210*b*.

At time t4 in FIG. 14, the writer 300 has completed writing on the board surface 210*b* and is writing an explanation content or the like exclusively using the board surface 210*c*.

At time t5 in FIG. 14, the writer 300 has completed writing on the board surface 210*c* and is performing replacement by raising and lowering the board surfaces 210*c* and 210*d*. The movement detection unit 13 detects the movement of the board surfaces 210*c* and 210*d*.

When the movement of the board surfaces 210*c* and 210*d* is detected, the writing log generation unit 15*b* acquires the detection result of the writing portion 250 in the frame immediately before the movement detection from the writing portion detection unit 14. In the frame immediately before the movement of the board surfaces 210*c* and 210*d* is detected, since the movement does not occur in any of the board surfaces 210*a* to 210*d*, the writing portion detection unit 14 detects and holds the writing portion 250 written on each of the board surfaces 210*a*, 210*b*, and 210*c*.

The writing log generation unit 15*b* generates the writing log 170 including the writing portion 250 written on each of the board surfaces 210*a*, 210*b*, and 210*c* from the detection result of the writing portion 250 acquired from the writing portion detection unit 14, and associates the writing log with the frame at time t5.

As described above, the writing log generation unit 15*b* generates the writing log 170 at times t2 and t5 by using the movement detection of the individual board surfaces 210*a* to 210*d* by the movement detection unit 13 as a trigger.

Here, it is considered that the timing at which the writer 300 or the like moves a predetermined board surface 210 is often the timing at which writing on the board surface 210 has been completed. Therefore, the writing log generated at the timing of the movement of the individual board surfaces 210*a* to 210*d* can be used as, for example, a record such as lecture notes, meeting minutes, or the like in which the writing content on the board surfaces 210*a* to 210*d* is recorded.
(Processing Example of Image Processing Device)

Figure 15:
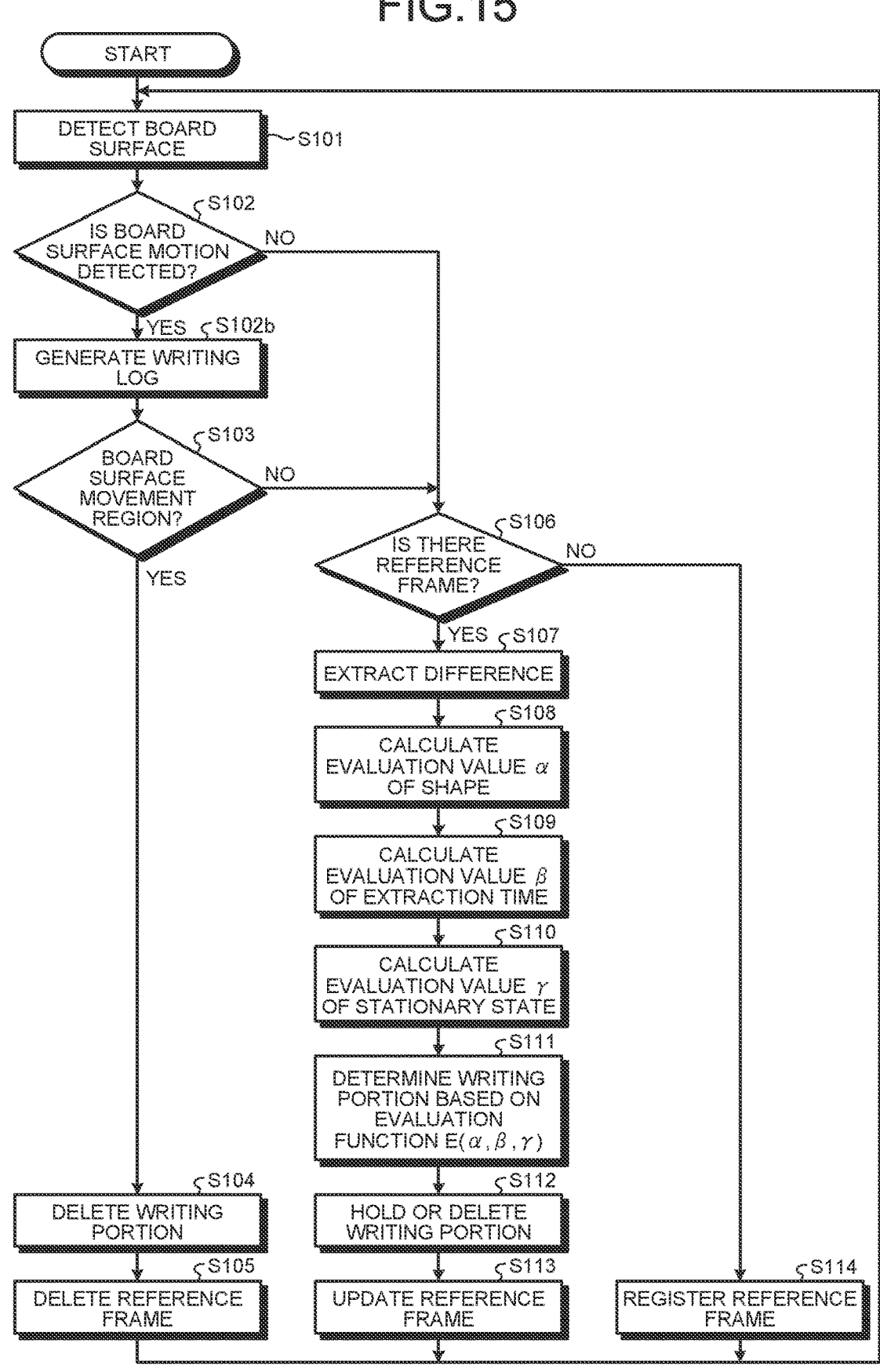
FIG. 15 is a flowchart illustrating an example of a procedure for image processing by the image processing device according to the third embodiment of the present disclosure.

Next, an example of image processing by the image processing device 10*b* of the third embodiment will be described with reference to FIG. 15. FIG. 15 is a flowchart illustrating an example of a procedure for image processing by the image processing device 10*b* according to the third embodiment of the present disclosure.

In the flowchart in FIG. 15, processing in Steps S101 to S114 is the same as processing in Steps S101 to S114 in FIG. 8 of the first embodiment described above, except for newly inserted Step S102b.

That is, in a case where the movement detection of the board surfaces 210a to 210d by the movement detection unit 13 (Step S101) does not detect the movement of all or some of the board surfaces 210 (Step S102 or Step S103: No), and there is no reference frame (Step S106: No) before the registration of the first reference frame in the initial stage of processing by the image processing device 10a or immediately after the reference frame is deleted because the movement of the board surfaces 210a to 210d occurs in the previous frame, the writing portion detection unit 14 registers the frame of the moving image data at that time as the reference frame (Step S114). Then, processing returns to the beginning again, for example, in the next frame.

In a case where there is the reference frame (Step S106: Yes) in the above case (Step S102 or Step S103: No), the writing portion detection unit 14 detects the writing portion, and reflects the holding and deleting results for the individual set portions determined to be the writing portion in the frame to be processed to update the reference frame (Steps S107 to S113). Then, processing returns to the beginning again, for example, in the next frame.

In a case where the movement of any of the board surfaces 210a to 210d has been detected (Step S102: Yes), and the region to be processed from now on is the region corresponding to the board surface 210 where the current movement has occurred (Step S103: Yes), the writing portion detection unit 14 deletes the writing portion held in the region corresponding to the board surface 210 where the current movement has occurred in the previous frame and the reference frame of the board surface 210 where the current movement has occurred (Steps S104 to S105).

On the other hand, when the movement of any of the board surfaces 210a to 210d is detected (Step S102: Yes), the writing log generation unit 15b generates the writing log (Step S102b).

Specifically, the writing log generation unit 15b acquires the detection result of the writing portion in the frame immediately before the movement of any of the board surfaces 210a to 210d is detected. In addition, the writing log generation unit 15b extracts the writing portion from the acquired detection result of the writing portion and generates the writing log. Furthermore, the writing log generation unit 15b stores the generated writing log in association with the frame at that time.

Then, image processing by the image processing device 10b of the third embodiment ends.

SUMMARY

According to the image processing device 10b of the third embodiment, the writing log is generated when the movement detection unit 13 detects the movement of a predetermined board surface 210. As a result, the record of the writing content on the board surfaces 210a to 210d can be kept.

In the third embodiment described above, the image processing device 10b has the function of generating the writing log. However, the image processing device having the writing log generation function may have the function of generating the composite moving image data by superimposing the writing portion on the moving image data, as in the image processing device 10a of the second embodiment described above. In this case, the generated writing log is stored in association with the corresponding frame of the composite moving image data, for example.

First Modification

Next, an image processing device of a first modification of the third embodiment will be described. The image processing device of the first modification is different from the third embodiment described above in that the image processing device determines whether or not to generate the writing log according to a movement speed of the board surfaces 210a to 210d.

A writing log generation unit of the image processing device of the first modification acquires information on the movement speed of the board surface 210 whose movement has been detected, together with a movement detection result of the board surfaces 210a to 210d, from a movement detection unit of the first modification. In addition, the writing log generation unit of the first modification determines whether or not to generate the writing log based on the information of the movement speed of the board surface 210.

For example, in a case where the movement speed of the board surface 210 is less than a predetermined value, the writing log generation unit of the first modification can be prevented from generating the writing log. Then, in a case where the movement speed of the board surface 210 is equal to or greater than the predetermined value, the writing log generation unit of the first modification can generate the writing log.

The user performs the setting as described above in advance on the image processing device of the first modification. When moving a predetermined board surface 210 during recording of the moving image data, the writer 300 or the like may slowly move the board surface 210 at the timing at which the writing log is considered to be unnecessary. On the other hand, the writer 300 may quickly move the board surface 210 at the timing at which the writing log is considered to be necessary.

According to the image processing device of the first modification, the writing log is generated when the movement detection unit of the first modification detects the movement of the board surface at a predetermined speed or more. As a result, for example, the writing log can be generated at a timing desired by the writer 300, and a more appropriate record can be kept.

Second Modification

Next, an image processing device of a second modification of the third embodiment will be described. The image processing device of the second modification is different from the third embodiment described above in that the image processing device determines whether or not to generate the writing log according to a progress status of writing on the board surface 210.

When the movement of a predetermined board surface 210 is detected, a writing log generation unit of the image processing device of the second modification acquires a detection result of a writing portion in a frame immediately before movement detection and a plurality of frames before the frame immediately before the movement detection, from a writing portion detection unit of the second modification.

In addition, the writing log generation unit of the second modification determines a writing direction of the writing portion on the board surface 210 whose movement has been detected from the detection result of the writing portion in the plurality of frames including the frame immediately before the movement detection of the board surface 210. As the writing direction, a case where the writing portion proceeds from top to bottom, for example, in the case of horizontal writing of the writing portion or the like, and a case where the writing portion proceeds from right to left, for example, in the case of vertical writing of the writing portion are considered.

In addition, the writing log generation unit of the second modification determines whether or not the writing portion detected in the frame immediately before the movement detection of the board surface 210 reaches from one end to the other end in the writing direction of the board surface 210.

That is, for example, in the case where the writing direction is from top to bottom, it is determined whether or not the writing portion reaches from the upper end to the lower end of the board surface 210. On the other hand, for example, in the case where the writing direction is from right to left, it is determined whether or not the writing portion reaches from the right end to the left end of the board surface 210.

Whether or not the writing portion reaches from one end to the other end of the board surface 210 can be determined based on, for example, information on a vertical width or a horizontal width of the board surface 210 or the like given from the user.

The writing log generation unit of the second modification generates the writing log in a case where the writing portion reaches from one end to the other end of the board surface 210. The writing log generation unit of the second modification does not generate the writing log in a case where the writing portion does not reach from one end to the other end of the board surface 210.

Here, in the case where the writing portion reaches from one end to the other end of the board surface 210, it can be considered that writing on the board surface has been completed. On the other hand, in a case where the writing portion does not reach from one end to the other end of the board surface 210, the writer 300 can still add writing on the board surface 210, and there is a possibility that additional writing will be performed to the writing portion, for example, by pulling back the board surface 210 that has been temporarily moved upward.

Therefore, by adding the condition that the writing portion reaches from one end to the other end of the board surface 210 to the writing log generation conditions, it is possible to generate the writing log at a more accurate timing at which the writing on the board surface 210 has been completed.

According to the image processing device of the second modification, the writing log is generated when the movement detection unit of the second modification detects the movement of the board surface 210 and the writing portion reaches the other end from one end of the board surface 210. As a result, it is possible to more reliably determine the timing at which writing on the predetermined board surface 210 has been completed and generate the writing log at a more appropriate timing. In addition, even in a case where additional writing is performed on the board surface 210 that has been pulled back in the middle of the movement, it is possible to suppress duplicated generation of the writing log for the similar writing content.

The effects described herein are merely examples and are not subject to limitations, and other effects may be provided.

OTHER EMBODIMENTS

The image processing devices of the first to third embodiments and the first to third modifications thereof described above are a computer including, for example, a CPU, a ROM, a RAM, and an I/O port. However, the image processing devices may have a configuration including an application specific integrated circuit (ASIC) dedicated for the application described above in the first to third embodiments and the first to third modifications thereof.

The image processing devices of the first to third embodiments and the first to third modifications thereof described above include an independent device configuration separated from the imaging device 20. However, the function of the image processing device may be mounted on the imaging device.

The image processing devices of the first to third embodiments and the first to third modifications thereof described above include a ROM in which the program related to image processing is stored. Such a program can be provided by being stored in a recording medium or the like so as to be readable by a computer, for example. The recording medium is, for example, a magnetic disk, an optical disk, a magneto-optical disk, a flash memory, or the like. Furthermore, the program described above may be distributed via, for example, a network without using the recording medium. In this case, the program may not necessarily be installed in the image processing device.

The present technique may also have the following configurations:

(1)

An image processing device comprising:

a movement detection unit that detects movement of a movable writing medium based on moving image data obtained by imaging the writing medium and a writer writing on the writing medium; and a writing portion detection unit that detects a writing portion on the writing medium, wherein the writing portion detection unit executes processing corresponding to the movement of the writing medium in a case where the movement of the writing medium is detected.

(2)

The image processing device according to (1), wherein the movement detection unit detects a straight line portion of a frame of the writing medium, and detects the movement of the writing medium by detecting the movement of the straight line portion.

(3)

The image processing device according to (2), wherein the movement detection unit distinguishes between a straight line included in the writing portion and the frame of the writing medium based on a length of the straight line portion.

(4)

The image processing device according to (1), wherein the movement detection unit detects the movement of the writing medium by estimating an optical flow in which movement of the writing portion associated with the movement of the writing medium is represented by a vector.

(5)

The image processing device according to (4), wherein the movement detection unit groups the optical flow and distinguishes between movement of the writer and the movement of the writing medium based on a size of a grouped region and a direction of movement.

(6)

The image processing device according to (1), wherein the movement detection unit detects the movement of the writing medium by recognizing the writing medium using general object recognition that recognizes an object by a general name, and tracking a position or a center of gravity of the writing medium.

(7)

The image processing device according to (6), wherein the movement detection unit distinguishes between movement of the writer and the movement of the writing medium by recognizing the writer as well using the general object recognition.

(8)

The image processing device according to any one of (1) to (7), wherein the writing portion detection unit deletes a detection result of the writing portion on the writing medium in a case where the movement of the writing medium is detected.

(9)

The image processing device according to (8), wherein the writing medium is one of a plurality of individually movable writing media included in a writing medium group, and the movement detection unit individually detects movement of the plurality of writing media, and, in a case where the movement of at least one of the plurality of writing media is detected, the writing portion detection unit deletes the detection result of the writing portion on the writing medium whose movement is detected and holds the detection result of the writing portion on the writing medium whose movement is not detected.

(10)

The image processing device according to any one of (1) to (9), wherein the movement detection unit changes an angle of view of an imaging device that images the moving image data in a case where the writing medium moves out of a frame of the moving image data.

(11)

The image processing device according to (10), wherein the movement detection unit causes imaging to be performed at a wider angle of view in a case where the angle of view of the imaging device is changed.

(12)

The image processing device according to any one of (1) to (9), further comprising a data generation unit that generates writing data based on a detection result of the writing portion.

(13)

The image processing device according to (12), wherein the data generation unit generates composite moving image data by superimposing the writing data on the moving image data.

(14)

The image processing device according to any one of (1) to (13), comprising a writing log generation unit that generates writing log based on a detection result by the movement detection unit.

(15)

The image processing device according to (14), wherein the writing log generation unit generates the writing log in a case where the movement detection unit detects the movement of the writing medium.

(16)

The image processing device according to (14), wherein the writing log generation unit generates the writing log in a case where the movement detection unit detects the movement of the writing medium at a predetermined speed or more.

(17)

The image processing device according to (13), wherein the writing log generation unit generates the writing log in a case where the movement detection unit detects the movement of the writing medium and the writing portion reaches from one end to the other end of the writing medium.

(18)

The image processing device according to any one of (1) to (17), wherein the movement detection unit detects the movement of the writing medium based on information related to the writing medium input by a user.

(19)

An image processing method comprising:

detecting movement of a movable writing medium based on moving image data obtained by imaging the writing medium and a writer writing on the writing medium; and detecting a writing portion on the writing medium, wherein in detecting the writing portion, processing corresponding to the movement of the writing medium is executed in a case where the movement of the writing medium is detected.

(20)

A program causing a computer to execute:

a process of detecting movement of a movable writing medium based on moving image data obtained by imaging the writing medium and a writer writing on the writing medium; and a process of detecting a writing portion on the writing medium, wherein, in the process of detecting the writing portion, processing corresponding to the movement of the writing medium is executed in a case where the movement of the writing medium is detected.

Although several embodiments of the present disclosure have been described, these embodiments have been presented as examples, and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the scope of the invention described in the claims and the equivalent thereof.

REFERENCE SIGNS LIST

1, 2 INFORMATION PROCESSING SYSTEM
10, 10a, 10b INFORMATION PROCESSING DEVICE
13 MOVEMENT DETECTION UNIT
14 WRITING PORTION DETECTION UNIT
15a DATA GENERATION UNIT
15b WRITING LOG GENERATION UNIT
20 IMAGING DEVICE

30 INOUT/OUTPUT DEVICE
40 RECORDING DEVICE

The invention claimed is:

1. An image processing device comprising:
circuitry configured to
  detect movement of at least one movable writing medium of a plurality of individually movable writing media included in a writing medium group based on moving image data obtained by imaging each movable writing medium and a writer writing on one or more of the plurality of individually movable writing media,
  detect a writing portion on the one or more of the plurality of individually movable writing media,
  execute processing on a detection result of the writing portion corresponding to the movement of each movable writing medium in a case where the movement of the at least one movable writing medium is detected, and
  generate a writing log based on a detection result of the movement,
  wherein the circuitry generates the writing log in a case where the movement of the at least one movable writing medium is detected.

2. The image processing device according to claim 1,
wherein the circuitry is further configured to
  detect a straight line portion of a frame of each movable writing medium, and
  detect the movement of the at least one movable writing medium by detecting movement of the straight line portion.

3. The image processing device according to claim 2,
wherein the circuitry is further configured to distinguish between a straight line included in the writing portion and the frame of each movable writing medium based on a length of the detected straight line portion.

4. The image processing device according to claim 1,
wherein the circuitry detects the movement of the at least one movable writing medium by estimating an optical flow in which movement of the writing portion associated with the movement of the at least one movable writing medium is represented by a vector.

5. The image processing device according to claim 4,
wherein the circuitry is further configured to
  group the optical flow, and
  distinguish between movement of the writer and the movement of the at least one movable writing medium based on a size of a grouped region and a direction of movement.

6. The image processing device according to claim 1,
wherein the circuitry detects the movement of the at least one movable writing medium by recognizing each movable writing medium using general object recognition that recognizes an object by a general name, and tracking a position or a center of gravity of each movable writing medium.

7. The image processing device according to claim 6,
wherein the circuitry is further configured to distinguish between movement of the writer and the movement of the at least one movable writing medium by recognizing the writer as well using the general object recognition.

8. The image processing device according to claim 1,
wherein the circuitry executes the processing by deleting the detection result of the writing portion on the at least one movable writing medium in a case where the movement of the at least one movable writing medium is detected.

9. The image processing device according to claim 8,
wherein the circuitry individually detects movement with respect to each movable writing media of the plurality of individually movable writing media, and
wherein, in a case where the movement of the at least one movable writing medium of the plurality of individually movable writing media is detected, the circuitry deletes the detection result of the writing portion on each writing medium whose movement is detected and holds the detection result of the writing portion on each writing medium whose movement is not detected.

10. The image processing device according to claim 1,
wherein the circuitry executes the processing by changing an angle of view of an imaging device that images the moving image data in a case where the at least one movable writing medium moves out of a frame of the obtained moving image data.

11. The image processing device according to claim 10,
wherein the circuitry executes the processing by causing imaging to be performed at a wider angle of view in a case where the angle of view of the imaging device is changed.

12. The image processing device according to claim 1,
wherein the circuitry is further configured to generate writing data based on the detection result of the writing portion.

13. The image processing device according to claim 12,
wherein the circuitry is further configured to generate composite moving image data by superimposing the generated writing data on the obtained moving image data.

14. The image processing device according to claim 1,
wherein the circuitry generates the writing log in a case where the movement of the at least one movable writing medium is detected at a predetermined speed or more.

15. The image processing device according to claim 1,
wherein the circuitry generates the writing log in a case where the movement of the at least one movable writing medium is detected and the writing portion reaches from a first end to a second end of the movable writing medium.

16. The image processing device according to claim 1,
wherein the circuitry detects the movement of the at least one movable writing medium based on information related to each movable writing medium input by a user.

17. An image processing method comprising:
detecting movement of at least one movable writing medium of a plurality of individually movable writing media included in a writing medium group based on moving image data obtained by imaging each movable writing medium and a writer writing on one or more of the plurality of individually movable writing media;
detecting a writing portion on the one or more of the plurality of individually movable writing media;
executing processing on a detection result of the writing portion corresponding to the movement of each movable writing medium is executed in a case where the movement of the at least one movable writing medium is detected; and
generating a writing log based on a detection result of the movement, wherein the writing log is generated in a case where the movement of the at least one movable writing medium is detected.

18. A non-transitory computer-readable storage medium having embodied thereon a program, which when executed by a computer causes the computer to execute a method, the method comprising:

detecting movement of at least one movable writing medium of a plurality of individually movable writing media included in a writing medium group based on moving image data obtained by imaging each movable writing medium and a writer writing on one or more of the plurality of individually movable writing media; and detecting a writing portion on the one or more of the plurality of individually movable writing media;

executing processing on a detection result of the writing portion corresponding to the movement of each movable writing medium is executed in a case where the movement of the at least one movable writing medium is detected; and generating a writing log based on a detection result of the movement, wherein the writing log is generated in a case where the movement of the at least one movable writing medium is detected.

\* \* \* \* \*